(12) United States Patent
Hirokawa

(10) Patent No.: US 11,916,914 B2
(45) Date of Patent: Feb. 27, 2024

(54) AT LEAST ONE INFORMATION PROCESSING APPARATUS, INFORMATION PROCESSING SYSTEM, AND PERMISSION GRANTING METHOD

(71) Applicant: Takahiro Hirokawa, Kanagawa (JP)

(72) Inventor: Takahiro Hirokawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 577 days.

(21) Appl. No.: 17/076,166

(22) Filed: Oct. 21, 2020

(65) Prior Publication Data

US 2021/0144146 A1 May 13, 2021

(30) Foreign Application Priority Data

Nov. 8, 2019 (JP) ................................. 2019-203342

(51) Int. Cl.
| | |
|---|---|
| G06F 21/00 | (2013.01) |
| H04L 9/40 | (2022.01) |
| G06Q 30/018 | (2023.01) |
| G06Q 10/105 | (2023.01) |
| G06Q 30/016 | (2023.01) |

(52) U.S. Cl.
CPC ......... *H04L 63/102* (2013.01); *G06Q 10/105* (2013.01); *G06Q 30/016* (2013.01); *G06Q 30/0185* (2013.01); *H04L 63/105* (2013.01)

(58) Field of Classification Search
CPC ... H04L 63/102; H04L 63/105; G06Q 10/105; G06Q 30/016; G06Q 30/0185
See application file for complete search history.

(56) References Cited

U.S. PATENT DOCUMENTS

| | | | |
|---|---|---|---|
| 8,763,145 B2* | 6/2014 | Mihara | G06F 21/105 |
| | | | 726/26 |
| 8,982,377 B2 | 3/2015 | Uchibori et al. | |
| 9,491,326 B2 | 11/2016 | Uchibori | |
| 9,754,088 B2 | 9/2017 | Ohzaki et al. | |
| 9,948,810 B2 | 4/2018 | Uchibori et al. | |
| 10,003,710 B2 | 6/2018 | Uchibori | |
| 10,306,080 B2 | 5/2019 | Uchibori et al. | |
| 10,511,737 B2 | 12/2019 | Uchibori | |
| 10,587,718 B2 | 3/2020 | Uchibori et al. | |
| 2007/0061325 A1* | 3/2007 | Akita | G06F 21/62 |
| | | | 707/999.009 |
| 2012/0127525 A1 | 5/2012 | Uchibori et al. | |
| 2012/0127527 A1 | 5/2012 | Nakabayashi et al. | |

(Continued)

FOREIGN PATENT DOCUMENTS

| | | |
|---|---|---|
| JP | 2007-072921 | 3/2007 |
| JP | 5814639 | 11/2015 |
| JP | 2016-091116 | 5/2016 |

OTHER PUBLICATIONS

Japanese Office Action for 2019-203342 dated May 30, 2023.

*Primary Examiner* — Kendall Dolly
(74) *Attorney, Agent, or Firm* — IPUSA, PLLC

(57) ABSTRACT

At least one information processing apparatus for providing a service to a user having a permission to use the service is provided. The at least one information processing apparatus includes a memory, and a processor coupled to the memory and configured to allow a management permission to be granted to a given user. The management permission enables assignment of the permission to use the service.

17 Claims, 21 Drawing Sheets

(56) References Cited

U.S. PATENT DOCUMENTS

2013/0314732 A1   11/2013  Nakabayashi et al.
2018/0278715 A1*  9/2018  Uchibori ................. H04L 51/18
2019/0095594 A1   3/2019  Uchibori
2019/0188362 A1   6/2019  Uchibori
2020/0204644 A1   6/2020  Uchibori et al.
2022/0156389 A1*  5/2022  Aoki ....................... G06F 21/31

* cited by examiner

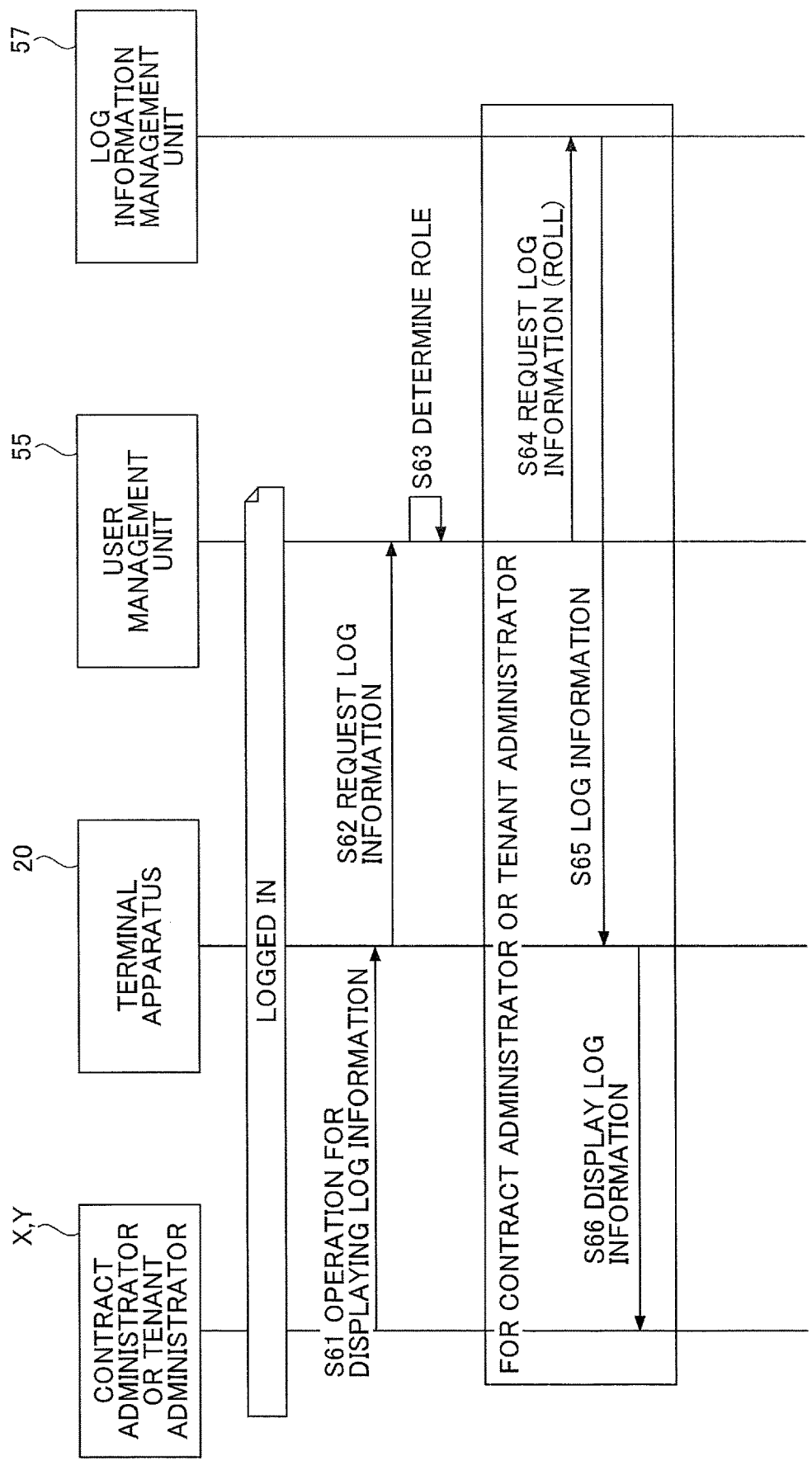

FIG.17B

SERVICE USE PERMISSION LOG INFORMATION

| LICENSE (CONTRACT) ID | ACTION | USER | TARGET USER | DATE AND TIME |
|---|---|---|---|---|
| L001 | ASSIGNED | CONTRACT ADMINISTRATOR A | GENERAL USER D | 2019/09/01 01:00:00 |
| L002 | ASSIGNED | GENERAL USER C | GENERAL USER D | 2019/09/02 01:00:00 |
| L002 | REMOVED | GENERAL USER C | GENERAL USER D | 2019/09/02 23:00:00 |

250

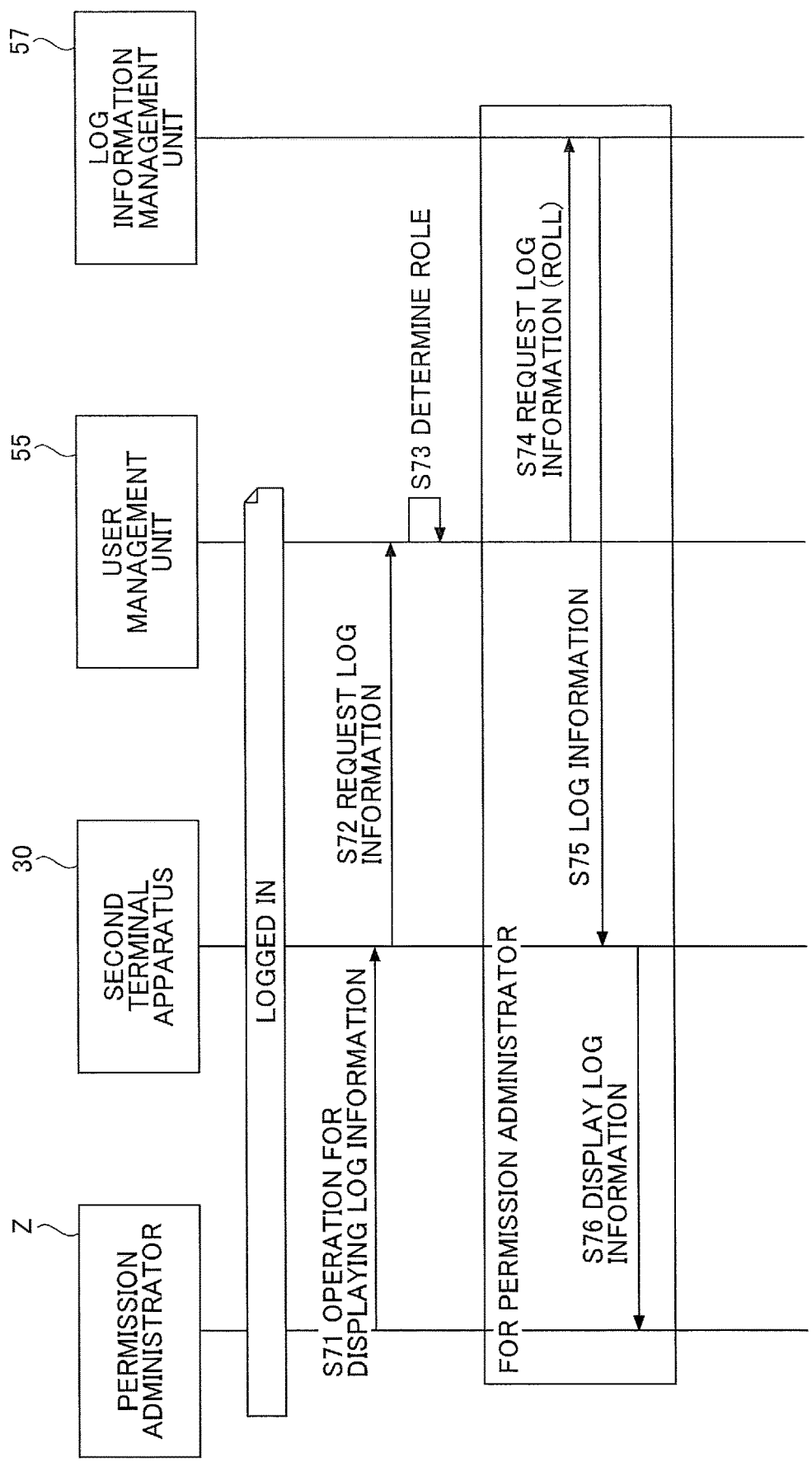

FIG.19B

| SERVICE USE PERMISSION LOG INFORMATION | | | | |
|---|---|---|---|---|
| LICENSE (CONTRACT) ID | ACTION | USER | TARGET USER | DATE AND TIME |
| L002 | ASSIGNED | GENERAL USER C | GENERAL USER D | 2019/09/02 01:00:00 |
| L002 | REMOVED | GENERAL USER C | GENERAL USER D | 2019/09/02 23:00:00 |

AT LEAST ONE INFORMATION PROCESSING APPARATUS, INFORMATION PROCESSING SYSTEM, AND PERMISSION GRANTING METHOD

CROSS-REFERENCE TO RELATED APPLICATIONS

The present application claims priority under 35 U.S.C. § 119 to Japanese Patent Application No. 2019-203342, filed on Nov. 8, 2019, the entire contents of which are incorporated herein by reference.

BACKGROUND OF THE INVENTION

1. Field of the Invention

The disclosures herein relate to an at least one information processing apparatus, an information processing system, and a permission granting method.

2. Description of the Related Art

One or more information processing apparatuses that provide software to users via a network is known. In an environment provided with a terminal apparatus, such as a personal computer (PC) or an electronic device, and a web browser running on the terminal apparatus, the user can use web application services provided by the one or more information processing apparatuses, by operating the terminal apparatus.

An organization such as a company may conclude a contract for services provided by one or more information processing apparatuses as described above, such that users belonging to the organization use the services. Organizations that conclude contracts for services are managed in units called tenants. In order for a user (such as an employee of a company) to use a service, the user needs to be registered in a tenant. For example, an administrator may register a user in a tenant (see Patent Document 1, for example). Patent Document 1 describes a user management method for assigning an access right to each customer user.

However, in the related-art, the one or more information processing apparatuses are not configured to allow a user to be granted permission to assign permissions to use a service.

RELATED-ART DOCUMENTS

Patent Documents

Patent Document 1: Japanese Patent No. 5814639

SUMMARY OF THE INVENTION

It is a general object of the described embodiments to provide one or more information processing apparatuses that allow a user to be granted permission to assign permissions to use a service.

According to an embodiment, at least one information processing apparatus for providing a service to a user having a permission to use the service is provided. The at least one information processing apparatus includes a memory, and a processor coupled to the memory and configured to allow a management permission to be granted to a given user. The management permission enables assignment of the permission to use the service.

BRIEF DESCRIPTION OF THE DRAWINGS

Other objects and further features of the present invention will be apparent from the following detailed description when read in conjunction with the accompanying drawings, in which:

FIG. 16 is a sequence diagram illustrating a process for displaying log information by the contract administrator or the tenant administrator;

FIG. 17A and FIG. 17B are diagrams illustrating examples of log information screens;

FIG. 18 is a sequence diagram illustrating a process for displaying log information by a permission administrator; and FIG. 19A and FIG. 19B are diagrams illustrating examples of log information screens.

DESCRIPTION OF THE EMBODIMENTS

According to an embodiment of the present invention, it is possible to provide one or more information processing apparatuses that allow a user to be granted permission to assign permissions to use a service.

In the following, an information processing system and a permission granting method performed by the information processing system according to embodiments of the present invention will be described.

<Assigning Use Permissions>

In a tenant, there is a contract administrator who manages contracts. The contract administrator is a person who manages service contracts. In many cases, the contract administrator also manages permissions to use services in addition to managing contracts. Therefore, as the number of users in the tenant increases, it becomes complicated for the contract administrator to manage the permissions. That is, it becomes difficult for the contract administrator to understand the actual use situation and determine an appropriate user to have permission to use a service.

An administrator who is granted permission to assign permissions to use a service is referred to as a "tenant administrator". Depending on the tenant, there may be cases where a tenant administrator assigns permissions to use a service to users. However, inconveniences as described above may occur.

<Assigning Management Permission>

In view of the above, in the embodiments, among contract administrator permissions or tenant administrator permissions, a contract administrator or a tenant administrator can grant a general user a "management permission (authority) to assign permissions to use a service". With the management permission (authority), the general user can have permission to do the following:

Assigning permissions to use a service to users.

Removing permissions to use a service from user.

Figure 1:
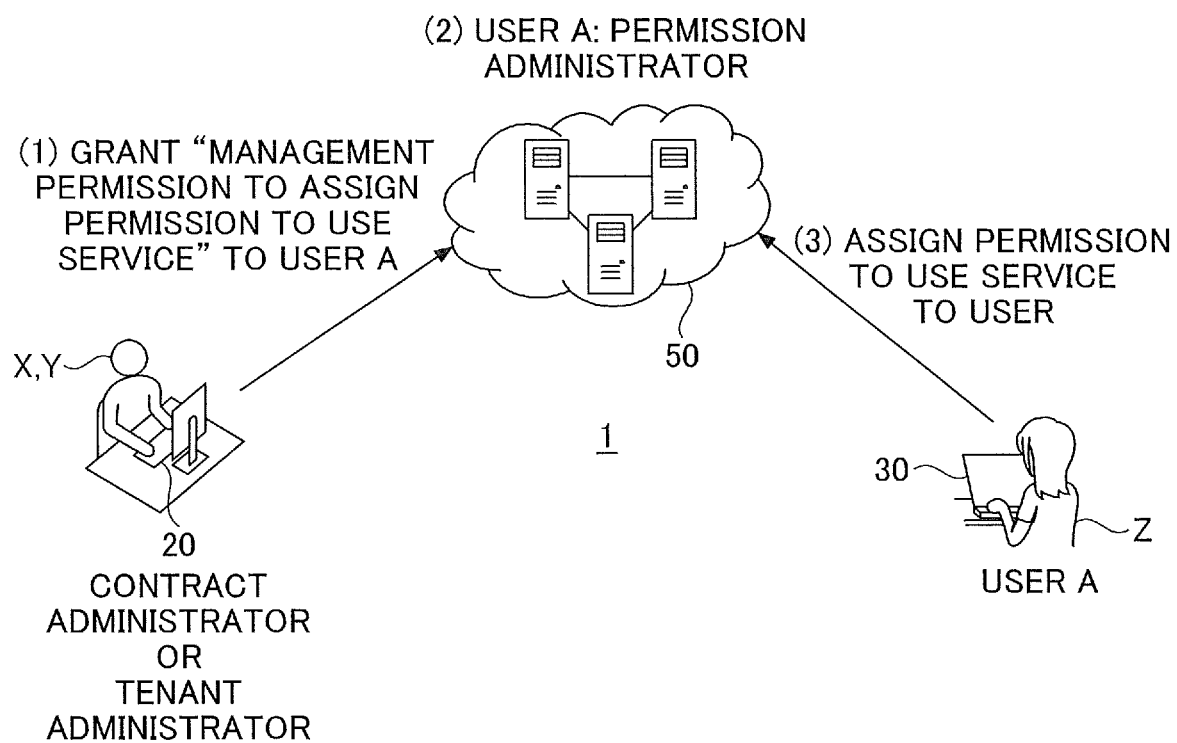
FIG. 1 is a diagram illustrating the overall process for granting a "management permission to assign permissions to use a service" to a general user by a contract administrator or a tenant administrator.

FIG. 1 is a diagram illustrating the overall process for granting a "management permission to assign permissions to use a service" to a general user by a contract administrator X or a tenant administrator Y.

(1) The contract administrator X or the tenant administrator Y (an example of a first user) operates a first terminal apparatus 20 to communicate with an information processing apparatus 50, among one or more information processing apparatuses 50, and assign a "management permission to assign permissions to use a service" to a user A. The user A is a general user (an example of a second user), and does not originally has a "management permission to assign permissions to use a service". If the user A is a tenant administrator, the user A can assign permissions to use a service. However, the tenant administrator originally have permission to assign permissions to use a service, and thus, there is basically no need to grant a management permission to the tenant administrator.

(2) The information processing apparatus 50 registers the user A as a "permission administrator Z".

(3) When the user A operates a second terminal apparatus 30 to log in to the information processing apparatus 50, the information processing apparatus 50 determines that the user A is the permission administrator Z and allows the user A to assign or remove a permission to use a service to or from another user.

As described above, in the embodiments, an information processing system 1 allows the contract administrator X or the tenant administrator Y to grant a management permission to a responsible person (general user) who works closely with other users. Accordingly, even if the number of users in a tenant increases, it is possible to assign permissions to use a service to appropriate users.

<Terminology>

As used herein, the term "role" is a role in a tenant. Permissions are granted according to the role. In the embodiments, a contract administrator, a tenant administrator, and a general user are roles. In a context not related to a role, a contract administrator, a tenant administrator, and a general user may be simply referred to as users.

The "contract administrator" is a person who manages contracts and manages matters relating to the use of services under a contract concluded between a company and a service provider. The "contract administrator" is often a person in charge at the tenant side. For example, the "contract administrator" registers a general user in the tenant, manages the status of a general user account, and registers a service available to the general user (assigns a permission to use the service to the general user).

The "tenant administrator" is a person who is granted permissions, except for permissions related to contracts. The "general user" is a user who can use a service when a permission to use the service is assigned.

As described above, the "permission administrator Z" is a person who is granted a management permission by the contract administrator X or the tenant administrator Y. The permission administrator Z is not a role.

Granting a "management permission" means granting a "permission to assign or remove permissions to use a service to or from users", while the contract administrator X or the tenant administrator Y holds a management permission. Note that the contract administrator X or the tenant administrator Y is not required to hold a management permission. The term "grant" may be interchanged with "transfer", "set", or "register".

A tenant is a group of customers who share the same software. That is, a tenant is a group of users who have permission to use a plurality of software instances in a system.

An application (hereinafter may be simply referred to as an "app") is a program executed by a terminal apparatus and an information processing apparatus such that a service is provided to a user. A program executed in cooperation with the terminal apparatus and the information processing apparatus is referred to as a web application. An application may be a workflow application that executes a series of processes sequentially. The tenant administrator Y can build an application by combining components. For example, the tenant administrator Y can build an application for uploading and saving documents read by an electronic device into storage on a cloud, by combining a component for reading documents, a component for transmission to the cloud, and other components.

<Example System Configuration>

Figure 2:
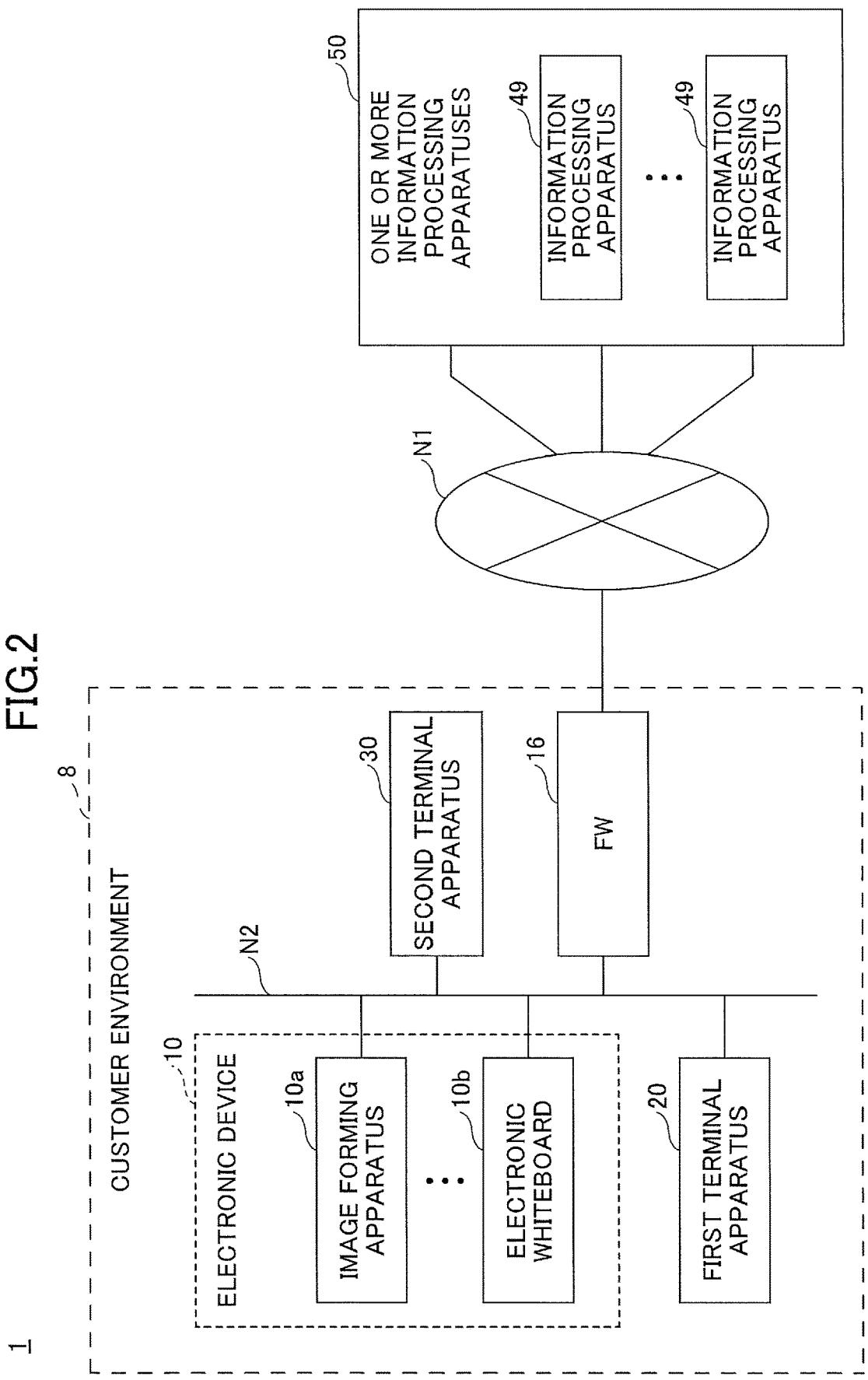
FIG. 2 is a diagram illustrating an example configuration of an information processing system.

FIG. 2 is a diagram illustrating an example configuration of an information processing system 1 according to an embodiment of the present invention. In the information processing system 1 of FIG. 2, a customer environment 8 is connected to one or more information processing apparatuses 50 via a network N1 such as the Internet. The network N1 includes a telephone line such as a mobile phone network.

<Example System Configuration>

A customer is provided with services provided by the one or more information processing apparatuses 50, and may include an organization such as a company, a group, an education agency, an administration agency, and a division. A user is a person who has some kind of employment relationship with the customer. In the customer environment 8, one or more electronic devices 10, a first terminal apparatus 20, a second terminal apparatus 30, and a firewall 16 are connected via a network N2 such as a local area network (LAN). Further, each of the one or more information processing apparatuses 50 includes one or more information processing apparatuses connected to the network N1.

An electronic device 10 may be an image forming apparatus 10a. Examples of the image forming apparatus 10a include a laser printer, a multifunction peripheral (or a multifunction printer) and a multifunction product/printer/peripheral (MPF). Further, the electronic device 10 may be an electronic whiteboard 10*b*. Alternatively, the electronic device 10 may be a projector (PJ), an output apparatus such as digital signage, a head-up display (HUD) apparatus, an industrial machine, an imaging apparatus, a sound collector, medical equipment, a network home appliance, a notebook personal computer (PC), a mobile phone, a smartphone, a tablet terminal, a game console, a personal digital assistant (PDA), a digital camera, a wearable PC, or a desktop PC.

In the present embodiment, the electronic device 10 serves as a terminal from which a user, registered in an information processing apparatus 50, uses services. The user logs in to the information processing apparatus 50 from the electronic device 10, selects an application (application software) authorized to be used by the user, and uses a service provided by the information processing apparatus 50. A service is provided per application.

The first terminal apparatus 20 is an information processing apparatus used by the contract administrator X or the tenant administrator Y. The first terminal apparatus 20 may be a smartphone, a mobile phone, a tablet PC, a desktop PC, or a notebook PC. A program such as a web browser having a screen display function is installed on the first terminal apparatus 20. The program is not limited to a web browser as long as the program has a function to display, as screens, various screen information received from the information processing apparatus. The program may be a program dedicated to the one or more information processing apparatuses 50.

The first terminal apparatus 20 is an information processing apparatus used by the contract administrator X or the tenant administrator Y. The first terminal apparatus 20 may be a smartphone, a mobile phone, a tablet PC, a desktop PC, or a notebook PC. A program such as a web browser having a screen display function is installed on the first terminal apparatus 20. The program is not limited to a web browser as long as the program has a function to display, as screens, various screen information received from the information processing apparatus. The program may be a program dedicated to the one or more information processing apparatuses 50.

The second terminal apparatus 30 is an information processing apparatus used by a general user (including the permission administrator). The second terminal apparatus 30 may be a smartphone, a mobile phone, a tablet PC, a desktop PC, or a notebook PC. A program such as a web browser having a screen display function is installed on the second terminal apparatus 30. The program is not limited to a web browser as long as the program has a function to display, as screens, various screen information received from the information processing apparatus. The program may be a program dedicated to the information processing apparatus 50.

The firewall 16 prevents entry into the customer environment 8 from the outside, and monitors all communications in the customer environment 8. However, this does not apply to a case where the first terminal apparatus 20 or the second terminal apparatus 30 communicates with the one or more information processing apparatuses 50 via a telephone line such as a mobile phone network.

The one or more information processing apparatuses 50 provide various services to the electronic device 10, the second terminal apparatus 30, and the like. The services vary depending on the type of the electronic device 10. In the case of the image forming apparatus 10*a*, the services include a service for uploading and storing documents onto storage on a cloud and a service for downloading and printing image data from the storage on the cloud. In the case of the electronic whiteboard 10*b*, the services include a service for creating minutes by recognizing speech in real time and a service for converting handwritten data into text. In the case of the second terminal apparatus 30, the services include a real-time web page translation service.

In the one or more information processing apparatuses 50, tenants are associated with users. Available services (applications) are determined in accordance with the role of a user. The user operates the electronic device 10 or the second terminal apparatus 30 to use the available applications. A tenant, a tenant administrator Y, and a user have the following relationships.

One customer=one tenant (A tenant administrator Y and a user belong to the one tenant.)

One customer=multiple tenants (A tenant administrator Y does not necessarily belong to a tenant, and manages the multiple tenants and users. The users belong to one or more tenants).

In both cases, users registered in the one or more information processing apparatuses 50 belong to tenants. Thus, when a registered user is identified, a tenant to which the user belongs is also identified. In the case of "one customer=one tenant", when a tenant administrator Y logs into a tenant, the tenant is automatically identified (there is no need to specify the tenant). In the case of "one customer=multiple tenants", a tenant administrator Y may log in to a tenant by specifying the tenant (or may have a different account for each tenant).

The one or more information processing apparatuses 50 create screen information of web pages to be displayed on the first terminal apparatus 20, the second terminal apparatus 30, or the electronic device 10, and transmit the screen information to the first terminal apparatus 20, the second terminal apparatus 30, or the electronic device 10. For example, a package creation screen, a user information registration screen, a package allocation screen, and a login screen, which will be described later, are displayed.

The screen information is created by HTML, XML, cascade style sheet (CSS), or JavaScript (registered trademark). A web application refers to software or its mechanism that runs on a web browser by a programming language, such as JavaScript (registered trademark running on the web browser, working together with a program on the web server side. A web page can be changed dynamically by the web application.

The one or more information processing apparatuses 50 may use cloud computing. The cloud computing is a form of use in which resources on a network are used without being conscious of a specific hardware resource. The one or more information processing apparatuses 50 using cloud computing may be referred to as a cloud system. The cloud system may be located on the Internet or on premises.

Further, the configuration of the information processing system 1 illustrated in FIG. 2 is merely an example. There may be one or more server apparatuses (such as proxy servers and gateway servers) between the information processing system 1 and the one or more information processing apparatuses 50. Further, the first terminal apparatus 20 and the second terminal apparatus 30 are not necessarily located in the customer environment, and may be connected to the network N1.

Each of the one or more information processing apparatuses 50 may be implemented by one information processing apparatus 49, or may be implemented by a plurality of information processing apparatuses 49. For example, there may be information processing apparatuses 49 on a per service basis, and the information processing apparatuses 49 may provide respective services. Alternatively, one information processing apparatus 49 may provide a plurality of services, or a plurality of information processing apparatuses 49 may provide one service.

Further, in the information processing system 1 illustrated in FIG. 2, the one or more information processing apparatuses 50 are connected to the network N1 such as the Internet outside the customer environment. In other words, in the information processing system 1 illustrated in FIG. 2, the one or more information processing apparatuses 50 are provided in a cloud environment. However, the one or more information processing apparatuses 50 may be provided in the customer environment (in the on-premises environment).

<Example Hardware Configuration>
<<Computer>>

Figure 3:
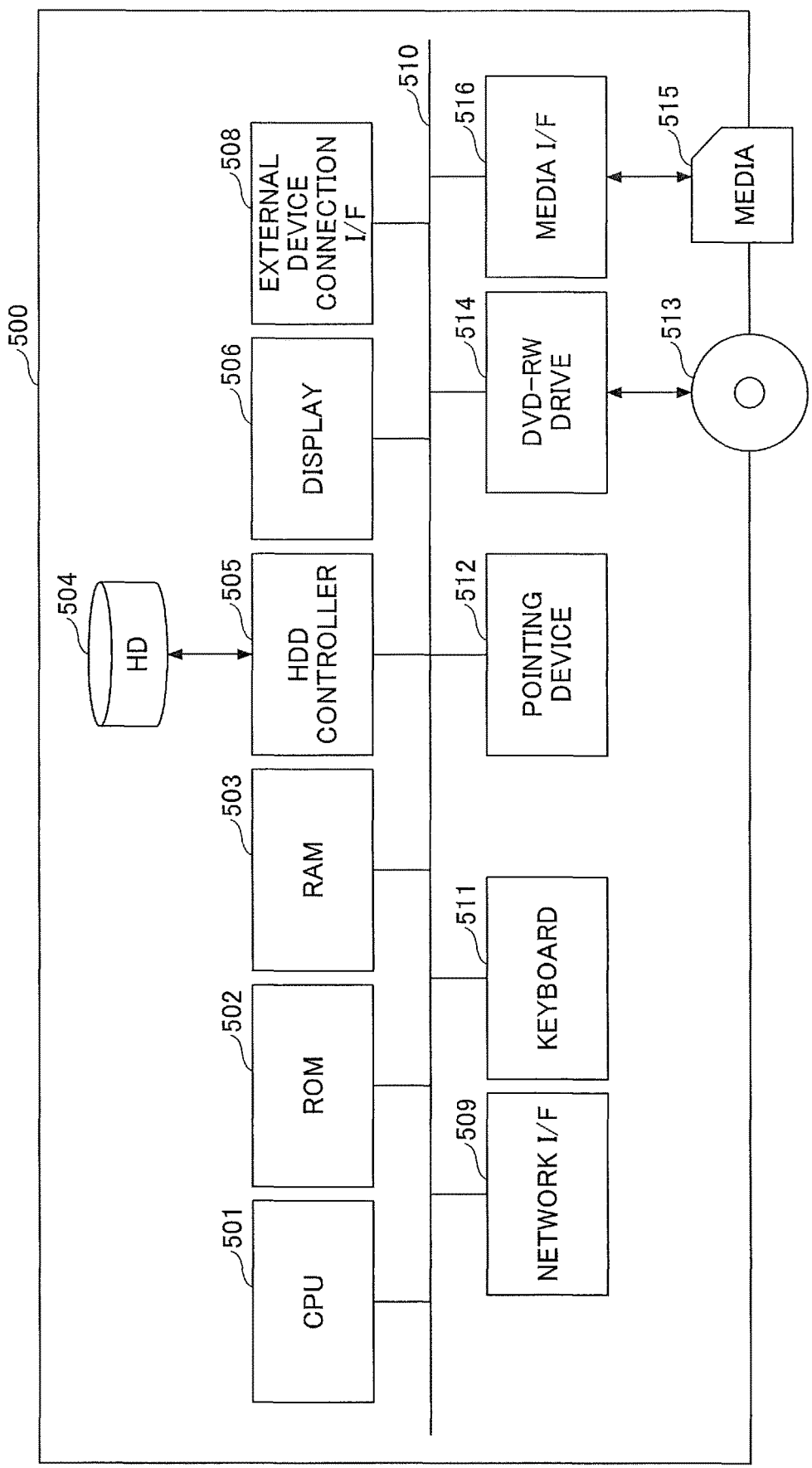
FIG. 3 is a diagram illustrating an example hardware configuration of a computer.

The first terminal apparatus 20, the second terminal apparatus 30, or the one or more information processing apparatuses 50 of FIG. 2 each may be implemented by a computer having a hardware configuration illustrated in FIG. 3. FIG. 3 is a diagram illustrating an example hardware configuration of a computer. A computer 500 of FIG. 3 includes a CPU 501, a read-only memory (ROM) 502, a random-access memory (RAM) 503, a hard disk (HD) 504, a hard disk drive (HDD) controller 505, a display 506, an external device connection interface (I/F) 508, a network I/F 509, a bus line 510, a keyboard 511, a pointing device 512, a digital versatile disc rewritable (DVD-RW) drive 514, and a media I/F 516.

The CPU 501 controls the entire operation of the computer. The ROM 502 stores programs used to drive the CPU 501 such as an initial program loader (IPL). The RAM 503 is used as a work area for the CPU 501. The HD 504 stores various types of data such as programs. The HDD controller 505 controls the reading/writing of various types of data from/to the HD 504, as controlled by the CPU 501. The display 506 displays various types of information such as a cursor, menus, windows, characters, and images. The external device connection I/F 508 is an interface for connecting various types of external devices. Examples of the external devices include a universal serial bus (USB) memory and a printer. The network I/F 509 is an interface for data communication via a communication network. The bus line 510 is an address bus, a data bus, or the like for electrically connecting the above-described elements such as the CPU 501 illustrated in FIG. 3.

The keyboard 511 is a type of an input device having a plurality of keys for inputting characters, numbers, and various types of instructions. The pointing device 512 is a type of an input device that selects or executes various types of instructions, selects an object to be processed, and moves the cursor. The DVD-RW drive 514 controls the reading/writing of various types of data from/to a DVD-RW 513. Note that the DVD-RW 513 is not limited to the DVD-RW, and may be a DVD-R. The media I/F 516 controls the reading/writing (storage) of data from/to (into) a media 515 such as a flash memory.

<<Image Forming Apparatus>>

Figure 4:
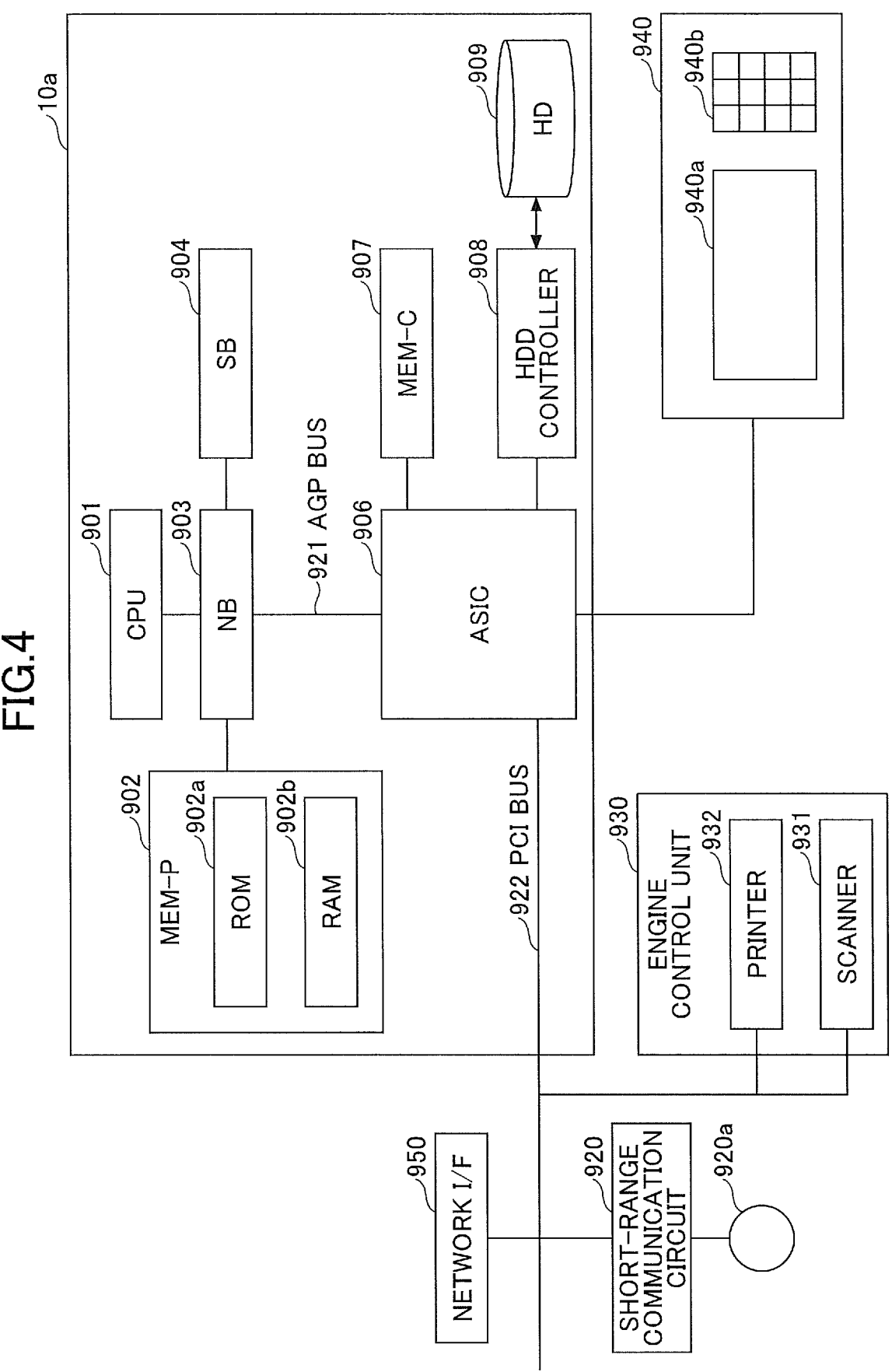
FIG. 4 is a diagram illustrating an example hardware configuration of an image forming apparatus.

FIG. 4 is a diagram illustrating an example hardware configuration of the image forming apparatus 10a. As illustrated in FIG. 4, the image forming apparatus 10a includes a controller 910, a short-range communication circuit 920, an engine control unit 930, an operation panel 940, and a network I/F 950.

The controller 910 includes a CPU 301, which is the main part of the computer, a system memory (MEM-P) 902, a northbridge (NB) 903, a southbridge (SB) 904, an application-specific integrated circuit (ASIC) 906, a local memory (MEM-C) 907, which is a storage device, an HDD controller 908, and a HD 909, which is a storage device. The NB 903 and the ASIC 906 are connected via an accelerated graphics port (AGP) bus 921.

The CPU 901 is a control unit that performs overall control of the image forming apparatus 10a. The NB 903 is a bridge that connects the CPU 901 to the MEM-P 902, the SB 904, and the AGP bus 921, and includes a memory controller that controls reading/writing from/to the MEM-P 902, a peripheral component interconnect (PCI) master, and an AGP target.

The MEM-P 902 includes a ROM 902a and a RAM 902b. The ROM 902a is a memory that stores programs and data for implementing functions of the controller 910. The RAM 902b is a memory used for deployment of programs and data, and for image rendering performed by a printer. A program stored in the RAM 902b may be recorded and provided in a computer-readable recording medium such as a CD-ROM, a CD-R or a DVD in an installable format or an executable format file.

The SB 904 is a bridge that connects the NB 903 to PCI devices and peripheral devices. The ASIC 906 is an integrated circuit (IC) for use in image processing and having hardware elements for image processing. The ASIC 906 serves as a bridge that connects the AGP bus 921, a PCI bus 922, the HDD controller 908, and the MEM-C 907. The ASIC 906 includes a PCI target and an AGP master, an arbiter (ARB) that forms the core of the ASIC 906, a memory controller that controls the MEM-C 907, a direct memory access controller that rotates image data using hardware logic, and a PCI unit that transfers data between a scanner 931 and a printer 932 via the PCI bus 922. Note that a USB interface and an Institute of Electrical and Electronics Engineers (IEEE) 1394 interface may be connected to the ASIC 906.

The MEM-C 907 is a local memory used as a copy image buffer and a code buffer. The HD 909 is a storage device that stores image data, font data used at the time of printing, and forms. The HDD controller 908 controls the reading/writing of data from/to the HD 909, as controlled by the CPU 901. The AGP bus 921 is a bus interface for a graphics accelerator card introduced to accelerate graphics processes. The AGP bus 921 directly accesses the MEM-P 902 with a high throughput, thereby accelerating processes related to the graphics accelerator card.

The short-range communication circuit 920 includes a short-range communication circuit antenna 920a. The short-range communication circuit 920 is a communication circuit such as near-field communication (NFC) or Bluetooth (registered trademark).

The engine control unit 930 includes the scanner 931 and the printer 932. The scanner 331 is a reading device that reads a document. The operation panel 940 includes a panel display 940a such as a touch panel, and also includes a hardware keyboard 940b. The panel display 940a displays current setting values and a selection screen, and receives an input from an operator. The hardware keyboard 940b includes a numeric keypad that receives setting values related to image forming conditions such as density setting conditions and also includes a start key that receives an instruction to start copying. The controller 910 performs overall control of the image forming apparatus 10a, and controls image rendering, communication, and inputs from the operation panel 940. The scanner 931 or the printer 932 includes an image processing section such as error diffusion or gamma correction.

In addition, the image forming apparatus 10*a* may use an application switching key of the operation panel 940 to switch between a document box function, the copy function, the printer function, and the facsimile function. When the document box function is selected, a document box mode is set, when the copy function is selected, a copy mode is set, when the printer function is selected, a printer mode is set, and when the facsimile function is selected, a facsimile mode is set.

The network I/F 950 is an interface for data communication via a communication network. The short-range communication circuit 920 and the network I/F 950 are electrically coupled to the ASIC 906 via the PCI bus 922.

<Functions>

Figure 5:
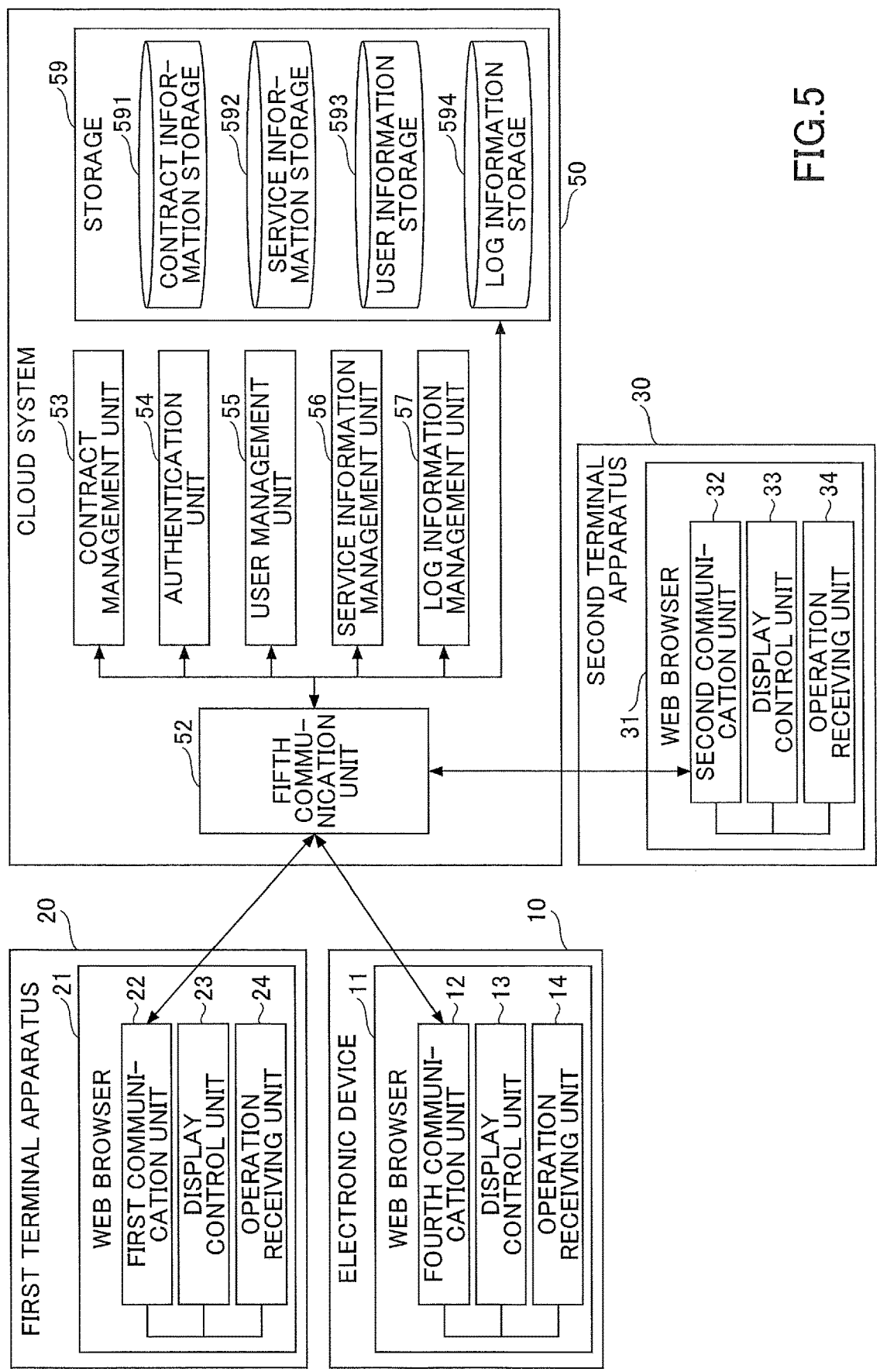
FIG. 5 is a diagram illustrating an example of functional blocks of a first terminal apparatus, a second terminal apparatus, an electronic device, and an information processing apparatus.

Functions of each apparatus included in the information processing system 1 according to the present embodiment may be implemented by functional blocks illustrated in FIG. 5. FIG. 5 is a diagram illustrating an example of functional blocks of the terminal apparatus 20, the second terminal apparatus 30, the electronic device 10, and an information processing apparatus 50.

<<First Terminal Apparatus>>

The first terminal apparatus 20 includes a first communication unit 22, a display control unit 23, and an operation receiving unit 24. The first terminal apparatus 20 implements the functions as illustrated in FIG. 5 by executing a program (such as a web browser 21).

The first communication unit 22 communicates with the information processing apparatus 50 and receives screen information used by the first terminal apparatus 20 to display a license management permission setting screen, which will be described later. Further, a contract administrator X or a tenant administrator Y transmits information, input on the license management permission setting screen to the information processing apparatus 50.

The display control unit 23 analyzes the screen information of the license management permission setting screen received from the information processing apparatus 50, and displays the license management permission setting screen on the display 506. The operation receiving unit 24 of the first terminal apparatus 20 receives an operation performed by the contract administrator X or the tenant administrator Y (such as an input performed on the license management permission setting screen).

<<Second Terminal Apparatus>>

The second terminal apparatus 30 includes a second communication unit 32, a display control unit 33, and an operation receiving unit 34. The second terminal apparatus 30 implements the functions as illustrated in FIG. 5 by executing a program (such as a web browser 31).

The second communication unit 32 communicates with the information processing apparatus 50 and receives screen information used by the second communication unit 32 to display a use permission management screen, a login screen, or a home screen, which will be described later. Further, a permission administrator Z transmits information, input on the use permission management screen, the login screen, or the home screen, to the information processing apparatus 50.

The display control unit 33 analyzes the screen information received from the information processing apparatus 50, and displays the use permission management screen, the login screen, or the home screen on the display 506. The operation receiving unit 34 of the second terminal apparatus 30 receives an operation performed by a general user (permission administrator Z).

<<Electronic Device>>

The electronic device 10 includes a fourth communication unit 12, a display control unit 13, and an operation receiving unit 14. The electronic device 10 implements the functions as illustrated in FIG. 5 by executing a program (such as a web browser 11).

The fourth communication unit 12 communicates with the information processing apparatus 50 and receives screen information used by the electronic device 10 to display a standby screen, a launcher screen, a login screen, or an application screen. Further, the general user transmits information, input on the standby screen, the launcher screen, the login screen, or the application screen, to the information processing apparatus 50.

The display control unit 13 analyzes the screen information received from the information processing apparatus 50, and displays the standby screen, the launcher screen, the login screen, or the application screen on the display 506. The operation receiving unit 14 of the electronic device 10 receives an operation (for starting a launcher, for inputting authentication information, for selecting an application, or for an application) performed by a general user.

<<Information Processing Apparatus>>

The information processing apparatus 50 includes a fifth communication unit 52, a contract management unit 53, an authentication unit 54, a user management unit 55, a service information management unit 56, and a log information management unit 57. The functions included in the information processing apparatus 50 are implemented by the CPU 501 of the computer 500 executing a program loaded from the HD 504 into the RAM 503.

The fifth communication unit 52 transmits/receives various information to/from the first terminal apparatus 20, the second terminal apparatus 30, and the electronic device 10. For example, the fifth communication unit 52 transmits screen information of the license management permission setting screen to the first terminal apparatus 20, screen information of the use permission management screen, the login screen, and the home screen to the second terminal apparatus 30, and screen information of the standby screen, the launcher screen, the login screen, and the application screen to the electronic device 10. Further, the fifth communication unit 52 receives information input on the above-described screens.

The contract management unit 53 manages contract information. The contract management unit 53 stores contract information in a contract information storage 591, which will be described later, and acquires contract information from the contract information storage 591.

The authentication unit 54 authenticates a contract administrator X, a tenant administrator Y, and a general user, and determines whether authentication is successful. Authenticating refers to determining whether a user who requests authentication has a valid permission. In the present embodiment, the authentication unit 54 determines whether the user has permission to use the information processing apparatus 50. In addition, the authentication unit 54 can determine whether the user is a contract administrator X, a tenant administrator Y, or a general user. Note that the general user may be a permission administrator Z. If authentication is successful, the contract administrator X, the tenant administrator Y, or the general user is allowed to log in to the information processing apparatus 50. A login refers to an authentication action performed by a user to access system resources with pre-registered account information in order to use various services on a computer or on the Internet. The account information may be a user ID and a password, an IC card number, or biometrics information.

The user management unit 55 manages user information. The user management unit 55 stores user information in a user information storage 593, which will be described later, and acquires (reads) user information from the user information storage 593.

The service information management unit 56 manages service information. The service information management unit 56 stores service information in a service information storage 592, which will be described later, and acquires (reads) service information from the service information storage 592.

The log information management unit 57 grants and removes management permissions to assign permissions to use services, and stores log information about granting and removing management permissions. Accordingly, even when a contract administrator X or a tenant administrator Y grants a general user a management permission to assign permissions to use a service, the contract administrator X or the tenant administrator Y can understand the assignment status of the permissions to use the service.

Figure 6:
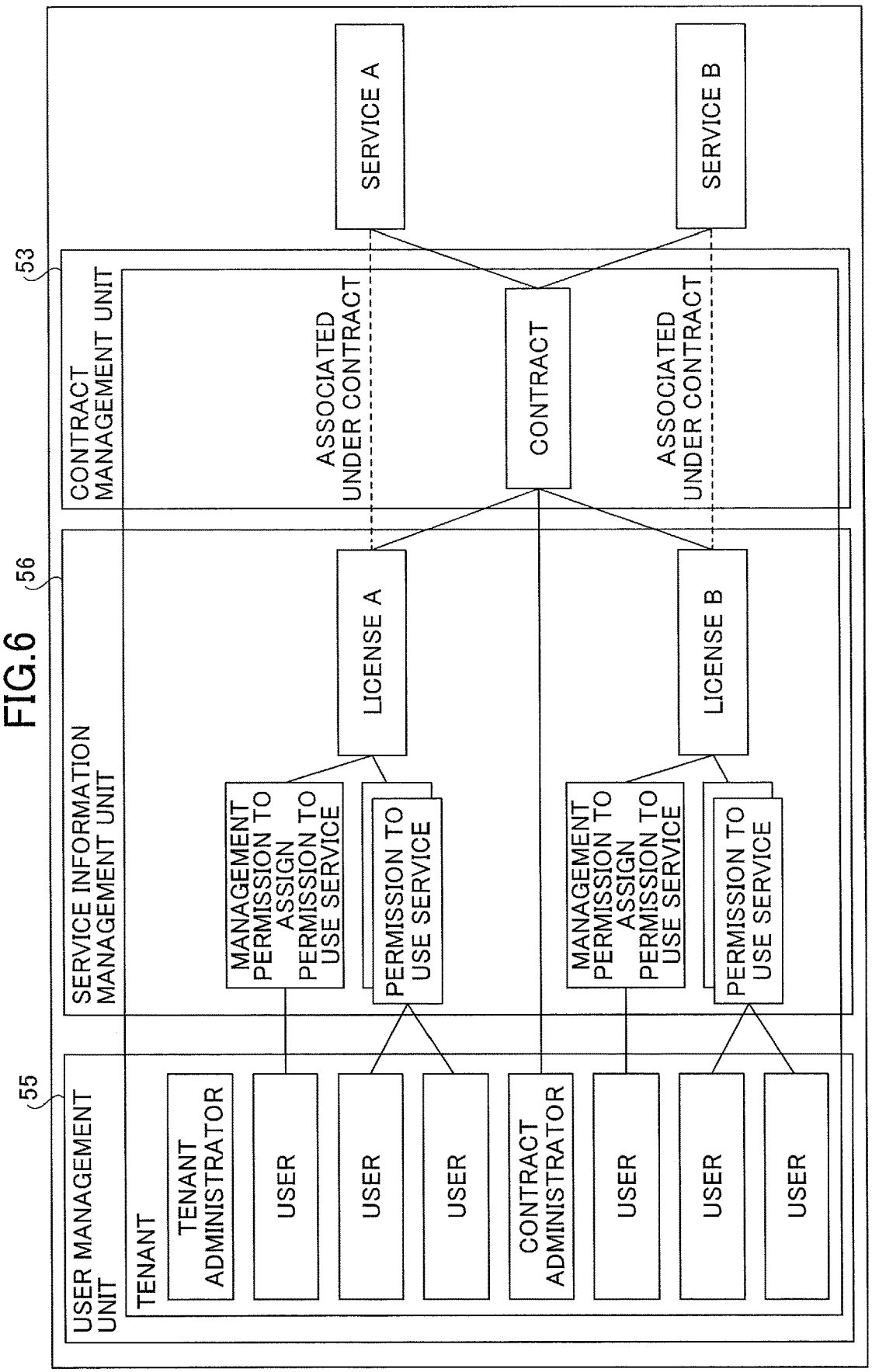
FIG. 6 is a diagram illustrating an example of the relationship between pieces of information described mainly with reference to Table 1 through Table 3.

Further, the information processing apparatus 50 includes a storage 59 implemented by the HD 504, the RAM 503, or the like as illustrated in FIG. 3. The storage 59 includes the contract information storage 591, the service information storage 592, the user information storage 593, and the log information storage 594. The contract information storage 591 will be described below with reference to Table 1. FIG. 6 indicates the relationship between each piece of information.

TABLE 1

| ITEM | DESCRIPTION |
|---|---|
| CONTRACT ID | IDENTIFICATION INFORMATION FOR IDENTIFYING CONTRACT |
| CONTRACT SERVICE | SERVICE PROVIDED |
| LICENSE ID | IDENTIFICATION INFORMATION OF LICENSE UNDER CONTRACT |
| TENANT ID | IDENTIFICATION INFORMATION OF TENANT UNDER CONTRACT |

Table 1 schematically indicates contract information stored in the contract information storage 591. The contract information is information on a contract concluded between a customer and a service provider. The contract information includes items such as a contract ID, a contract service, a license ID, and a tenant ID.

Contract ID: Identification information for identifying a contract between a service provider and a customer (tenant).

Contract service: A service provided under the contract. For example, the name of the service or the description of the service is indicated.

License ID: Identification information of a license granted to the tenant under the contract. The license means permission to use the service. The details of the license is set in service information. Note that a plurality of license IDs may be included in one contract.

Tenant ID: Identification information of the tenant representing the customer who has concluded the contract for the service.

TABLE 2

| ITEM | DESCRIPTION |
|---|---|
| LICENSE ID | — |
| TENANT ID | IDENTIFICATION INFORMATION FOR IDENTIFYING TENANT ASSOCIATED WITH LICENSE |
| CONTRACT ID | IDENTIFICATION INFORMATION FOR IDENTIFYING CONTRACT ASSOCIATED WITH LICENSE |
| SERVICE TYPE | INFORMATION INDICATING WHETHER SERVICE IS AVAILABLE TO USERS OR DEVICES |
| NUMBER OF ISSUABLE PERMISSIONS | THE NUMBER OF PERMISSIONS THAT CAN BE ASSIGNED TO USERS |
| START DATE | START DATE OF LICENSE |
| END DATE | END DATE OF LICENSE |

Table 2 schematically indicates service information stored in the service information storage 592. The service information is information on a service provided under a contract. The service information includes items such as a license ID, a tenant ID, a contract ID, a service type, a number of users, a start date, and an end date.

License ID: Identification information of a license granted under a contract.

Tenant ID: Identification information of a tenant having the license.

Contract ID: Identification information of the contract under which the license is provided.

Service type: Information indicating whether the service is available to users or electronic devices.

Number of issuable permissions: The number of permissions that can be assigned to users under the license (the number of users who can use the service).

Start date: Start date of a period of time during which the license is valid.

End date: End date of the period of time during which the license is valid.

TABLE 3

| ITEM | DESCRIPTION |
|---|---|
| TENANT ID | IDENTIFICATION INFORMATION FOR IDENTIFYING TENANT TO WHICH USER BELONGS |
| USER ID | — |
| ROLE | TENANT ADMINISTRATOR, CONTRACT ADMINISTRATOR, OR (GENERAL) USER |
| LICENSE (CONTRACT) FOR WHICH MANAGEMENT PERMISSION IS GRANTED | (THERE MAY BE MULTIPLE LICENSES) |
| LICENSE (CONTRACT) FOR WHICH SERVICE USE PERMISSION IS GRANTED | (THERE MAY BE MULTIPLE LICENSES) |

Table 3 schematically indicates user information stored in the user information storage 593. The user information is information on a user belonging to a tenant. The user information includes items such as a tenant ID, a user ID, a role, a license (contract) for which a management permission is granted, and a license (contract) for which a service use permission is granted.

Tenant ID: Identification information of a tenant to which a user belongs.

User ID: Identification information of the user.

Role: A role of the user. For example, a contract administrator X, a tenant administrator Y, and a general user are roles.

License (contract) for which a management permission is granted: If the user is granted a management permission to assign permissions to use a service, a license ID of the service is indicated. Multiple license IDs may be indicated. If the management permission is granted for a contract, a contract ID of the contract is indicated.

License (contract) for which a service use permission is granted: A license ID of a service for which the user has a permission to use is indicated. Multiple license IDs may be indicated. If the service use permission is granted for a contract, a contract ID of the contract is set.

Although the user information in Table 3 does not include a password, general user information such as a password and a user name may be included.

TABLE 4A

| ITEM | DESCRIPTION |
| --- | --- |
| MANAGEMENT SCOPE | MANAGEMENT SCOPE OF MANAGEMENT PERMISSION |
| MANAGEMENT TARGET ID | LICENSE (CONTRACT) ID FOR WHICH MANAGEMENT PERMISSION IS GRANTED |
| ACTION | GRANTED OR REMOVED |
| USER ID | USER ID OF USER WHO PERFORMED ACTION |
| TARGET USER ID | USER ID OF USER TARGETED FOR ACTION |
| TIME AND DATE | TIME AND DATE WHEN ACTION IS PERFORMED |

Table 4A schematically indicates management permission log information stored in the log information storage 594. The management permission log information is information recording who grants a management permission to whom. The management permission log information includes items such as a management scope, a management target ID, an action, a user ID, a target user ID, and a time and date.

Management scope: Information whether a management permission is granted on a per contract basis or a per license basis is indicated.

Management target ID: A license ID (if the management scope is on a per license basis) or a contract ID (if the management scope is on a per contract basis) for which a general user is granted the management permission by a contract administrator X or a tenant administrator Y.

Action: Information whether the management permission is granted or removed is indicated.

User ID: A user ID of the contract administrator X or the tenant administrator Y by whom the management permission is granted or removed.

Target user ID: A user ID of a general user to which the management permission is granted or from which the management permission is removed.

Date and time: A date and time when the management permission is granted or removed.

TABLE 4B

| ITEM | DESCRIPTION |
| --- | --- |
| LICENSE ID | LICENSE ID |
| ACTION | GRANTED OR REMOVED |
| USER ID | USER ID OF USER WHO PERFORMED ACTION |
| TARGET USER ID | USER ID OF USER TARGETED FOR ACTION |
| TIME AND DATE | TIME AND DATE WHEN ACTION IS PERFORMED |

Table 4B schematically indicates service use permission log information stored in the log information storage 594. The service use permission log information is information that records who grants a permission to whom. The service use permission log information includes items such as a "license ID", an "action", a "user ID", a "target user ID", and a "time and date".

License ID: identification information of a license for which a permission is granted.

Action: Information whether the permission to use the license is granted or removed is indicated.

User ID: A user ID of a user (a contract administrator, a tenant administrator, or a permission administrator) by whom the permission to use the license is granted or removed.

Target user ID: A user ID of a general user (a contract administrator, a tenant administrator, a permission administrator) to which the permission to use the license is granted or from which the permission to use the license is removed.

Date and time: A date and time when the permission to use the license is granted or removed.

Table 1 through Table 4 are merely for descriptive purposes and indicate main information only. Table 1 through Table 4 may include any other information.

<Relationship Between Each Piece of Information>

FIG. 6 is a diagram illustrating the relationship between pieces of information described mainly with reference to Table 1 through Table 3. The user management unit 55, the service information management unit 56, and the contract management unit 53 illustrated in FIG. 6 are functional blocks that mainly manage the above-described information.

For example, there assumed to be two services A and B (there may be one service or three or more services). When a customer concludes a contract for the service A, a license A is granted. When the customer concludes a contract for the service B, a license B is granted. In the example of FIG. 6, a contract for both the services A and B are concluded by the customer. The customer (or an organization to which the customer belongs) is referred to as a tenant. The licenses A and B are generated under the contract. The services A and B are associated with the licenses A and B under the contract.

For each of the licenses A and B, one or more permissions can be issued. The permissions are permissions to use a corresponding service. The number of permissions are defined by a contract. Therefore, permissions are assigned to users in a tenant up to the number defined by the contract. In the related art, a contract administrator X and a tenant administrator Y have permission to assign permissions to use a service.

In a tenant, there are a contract administrator X and a tenant administrator (there may be only a contract administrator X), and the contract administrator X manages contracts. Managing contracts means having permission to edit contract information.

In the present embodiment, for each of the licenses A and B, a management permission to assign one or more permissions to use a corresponding service can be issued. A user granted the management permission can assign the permissions to use the corresponding service.

<Granting Management Permission>

Figure 7:
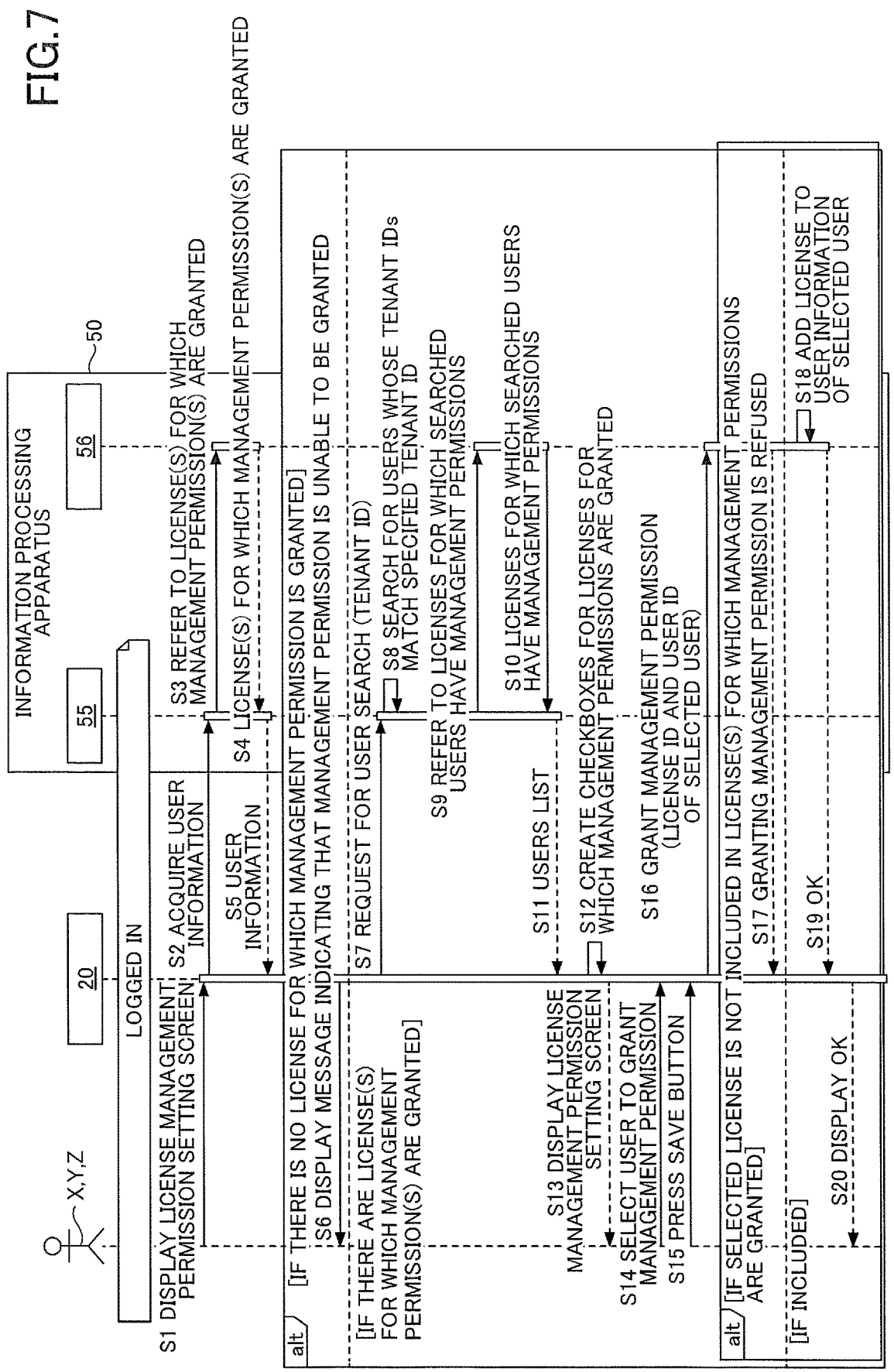
FIG. 7 is a sequence diagram illustrating a process for granting a "management permission to assign permissions to use a service" to a general user by a contract administrator or a tenant administrator.

Next, a process for granting a "management permission to assign permissions to use a service" will be described with reference to FIG. 7. FIG. 7 is a sequence diagram illustrating a process for granting a "management permission to assign permissions to use a service" to a general user (permission administrator Z) by a contract administrator X or a tenant administrator Y. Note that the permission administrator Z can grant the management permission to another general user. In the example of FIG. 7, the contract administrator X or the tenant administrator Y are logged in to the information processing apparatus 50 (authenticated by the authentication unit 54), and the role of the contract administrator X or the tenant administrator Y are identified.

In S1, the contract administrator X or the tenant administrator Y uses the first terminal apparatus 20 to perform an operation for displaying a license management permission setting screen.

In S2, the operation receiving unit 24 of the first terminal apparatus 20 receives the operation, and the first communication unit 22 transmits a request for user information of the contract administrator X or the tenant administrator Y, to the information processing apparatus 50. The first communication unit 22 may transmit identification information such as a user ID.

In S3 and S4, the fifth communication unit 52 of the information processing apparatus 50 receives the request for user information. The user management unit 55 acquires user information based on the user ID, which has been identified when the contract administrator X or the tenant administrator Y logged in, and acquires license(s) for which management permission(s) are granted. In addition, the user management unit 55 acquires service information associated with the license ID(s). Note that although the service information management unit 56 actually manages permissions as illustrated in FIG. 6, the user management unit 55 is configured to generate a license(s) list for which management permission(s) are granted in order to respond to a request for user information of a user.

In S5, the fifth communication unit 52 of the information processing apparatus 50 transmits the license(s) for which the contract administrator X or the tenant administrator Y has management permission(s), to the first terminal apparatus 20.

In S6, if there is no license for which a management permission is granted, the contract administrator X or the tenant administrator Y is unable to grant a management permission. Therefore, the information processing apparatus 50 transmits a message, indicating that a license management permission setting screen is unable to be displayed, to the first terminal apparatus 20. Then, the display control unit 23 displays the message on the first terminal apparatus 20.

In S7, if there are license(s) for which management permission(s) are granted, the first communication unit 22 of the first terminal apparatus 20 transmits a request for user search by specifying a tenant ID, which has been identified when the contract administrator X or the tenant administrator Y logged in, to the information processing apparatus 50.

In S8, the fifth communication unit 52 of the information processing apparatus 50 receives the request for user search, and searches for users whose tenant IDs match the specified tenant ID by referring to user information. In this manner, the users belonging to the tenant can be identified.

In S9 and S10, the user management unit 55 acquires licenses for which searched users have management permissions. This is because some users may already have management permissions. The user management unit 55 acquires license information of the users based on user IDs.

In S11, the user management unit 55 creates the users list, including the licenses for which some users have the management permissions, and transmits the users list to the first terminal apparatus 20.

In S12, the display control unit 23 of the first terminal apparatus 20 generates a license management permission setting screen on which checkboxes are created for licenses, for which the contract administrator X or the tenant administrator Y have management permissions, on a per user basis. In addition, the display control unit 23 sets checkmarks for the licenses for which the users already have the management permissions.

Figure 8:
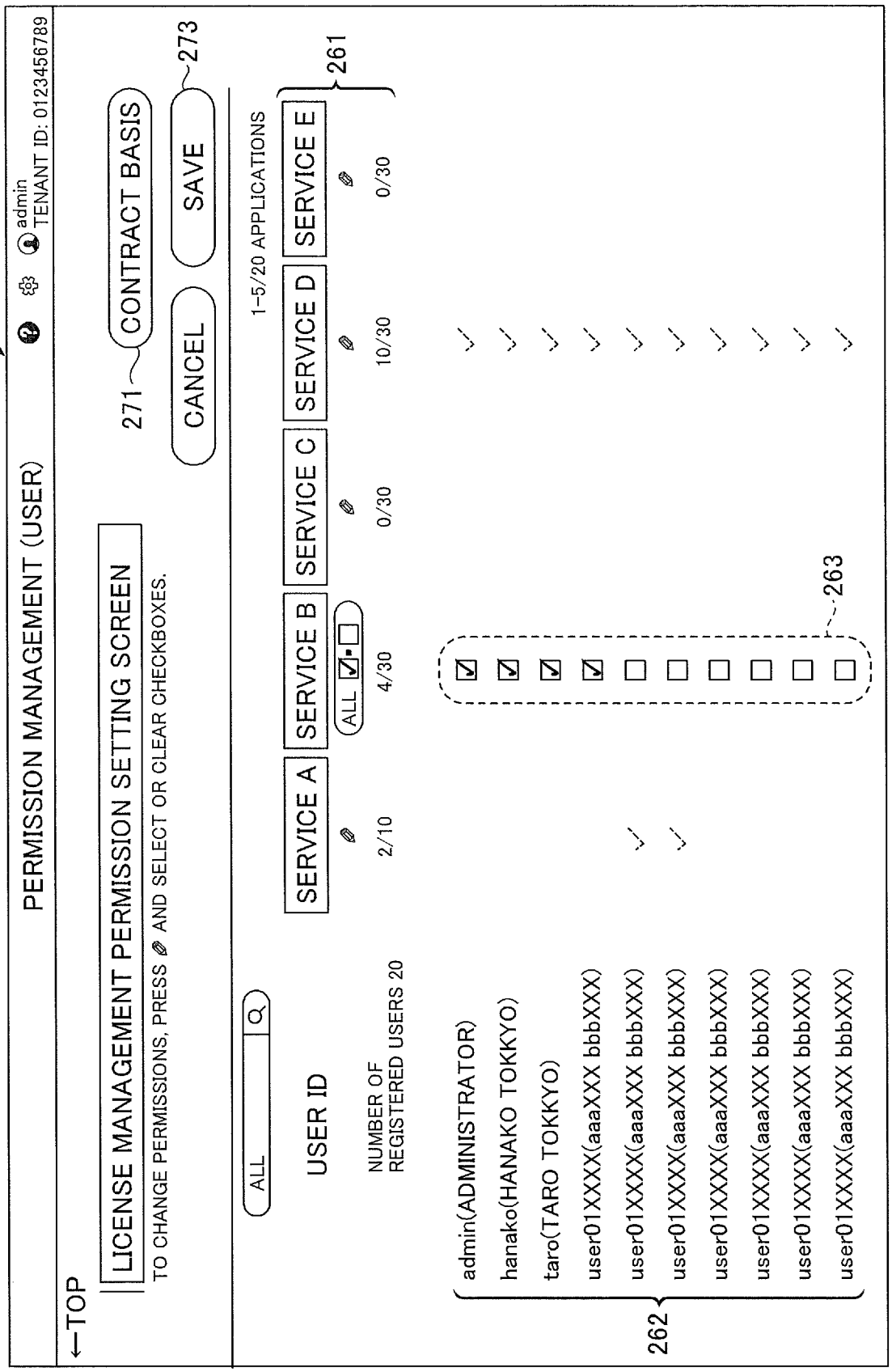
FIG. 8 is a diagram illustrating an example of a license management permission setting screen.

In S13, the display control unit 23 of the first terminal apparatus 20 displays the license management permission setting screen. FIG. 8 depicts an example of the license management permission setting screen.

In S14, the contract administrator X or the tenant administrator Y selects a user to grant or remove a management permission on the license management permission setting screen. The contract administrator X or the tenant administrator Y can switch between granting a management permission on a per contract basis and granting a management permission on a per license basis.

In S15, the contract administrator X or the tenant administrator Y presses a save button 273 on the license management permission setting screen.

In S16, the operation receiving unit 24 of the first terminal apparatus 20 receives the operation. The first communication unit 22 transmits a request for a user ID of the user to whom the management permission is granted and a license ID for which the management permission is granted, to the information processing apparatus 50. The first communication unit 22 also indicates whether the management permission is granted on a per contract basis or on a per license basis. If there is an upper limit on the number of management permissions that can be granted, the display control unit 33 may calculate the number of users to whom management permissions are granted. In this manner, the contract administrator X or the tenant administrator Y can determine whether the number of management permissions granted to users exceeds the upper limit. If the upper limit is exceeded, the fifth communication unit 52 of the information processing apparatus 50 notifies the contract administrator X or the tenant administrator Y in this regard.

In S17, the fifth communication unit 52 of the information processing apparatus 50 receives the user ID and the license ID. At this time, if the license of the received license ID is not included in the license(s) for which the contract administrator X or the tenant administrator Y has management permissions, the service information management unit 56 transmits a message, indicating that granting the management permission is refused, to the first terminal apparatus 20. Accordingly, the license is checked twice in step S12 and step S17.

In S18, if the license is included in the license(s) for which the contract administrator X or the tenant administrator Y has management permissions, the service information management unit 56 adds the license to user information of the selected user. Accordingly, the information processing apparatus 50 allows the management permission to be granted to the user from the first terminal apparatus 20 operated by the contract administrator X or the tenant administrator Y who is authorized to have a predetermined permission.

Further, the log information management unit 57 stores management permission log information in the log information storage 594. The log information management unit 57 sets whether the management permission is granted on a per license basis or on a per contract basis to the item "management scope", sets the added license to the item "management target ID", sets "assigned" to the item "action", sets the user ID of the contract administrator X or the tenant administrator Y to the item "user ID", and sets the user ID of the user selected on the license management permission setting screen to the item "target user ID", and the current date and time to the item "date and time".

In S19 and S20, a message indicating the completion of the grant of the management permission is displayed on the first terminal apparatus 20.

As described above, the contract administrator X or the tenant administrator Y can grant the management permission to the general user on a per license basis or on a per contract basis.

<<License Management Permission Setting Screen>>

FIG. 8 is a diagram illustrating an example of a license management permission setting screen 200. The license management permission setting screen 200 displays a list of users 262 associated with services for which a tenant has a contract. A list of services 261 displayed on the license management permission setting screen 200 represents the licenses. The list of the users 262 indicates users who belong to the tenant. The list of services 261 indicates services for which the tenant has the contract. If there is an upper limit on the number of management permissions that can be granted, the upper limit and the current number of management permissions that have been granted may be displayed below the list of services 261.

Checkboxes 263 are displayed for the licenses (services) for which the contract administrator X or the tenant administrator Y has management permissions. In FIG. 8, the checkboxes 263 are displayed for the service B.

Further, checkmarks are displayed for users who already have management permissions without any operation by the contract administrator X or the tenant administrator Y. In FIG. 8, checkmarks are displayed for the service D. In addition, checkmarks are displayed for the service A for some users. The contract administrator X or the tenant administrator Y can select a checkbox 263 to grant a management permission to a general user. Further, the contract administrator X or the tenant administrator Y can clear a checkbox 263 to remove a management permission from a general user.

The license management permission setting screen 200 of FIG. 8 is a screen on which management permissions are granted on a per service (application) basis. In the present embodiment, management permissions can also be granted on a per contract basis. The contract administrator X or the tenant administrator Y can press a contract basis button 271 to switch from the service basis to the contract basis.

Figure 9:
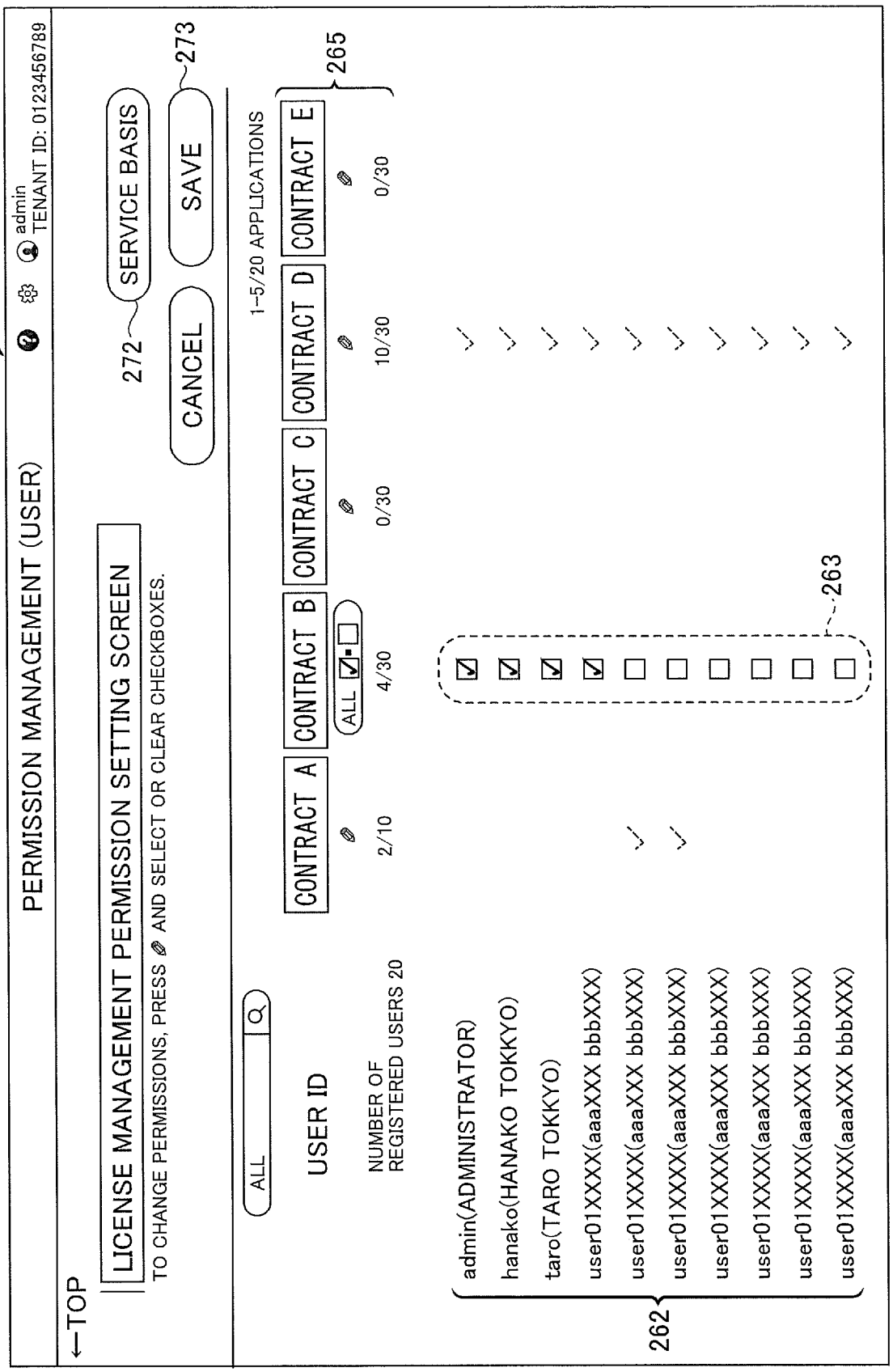
FIG. 9 is a diagram illustrating an example of a license management permission setting screen on which management permissions are assigned on a per contract basis.

FIG. 9 is a diagram illustrating an example of a license management permission setting screen on which management permissions are granted on a per contract basis. The license management permission setting screen of FIG. 9 includes a list of contracts 265, instead of the list of services 261. The contract administrator X or the tenant administrator Y can assign a management permission on a per contract basis. The list of contracts 265 of FIG. 9 can be identified from contract information of the contracts concluded by the tenant. The contract administrator X or the tenant administrator Y can press a service basis button 272 to return to the screen of FIG. 8.

Accordingly, the information processing apparatus 50 can grant a management permission to a general user in accordance with the setting as to whether the management permission is granted on a per contract basis or granted on a per license basis.

<Assigning Use Permission by Permission Administrator>

Figure 10:
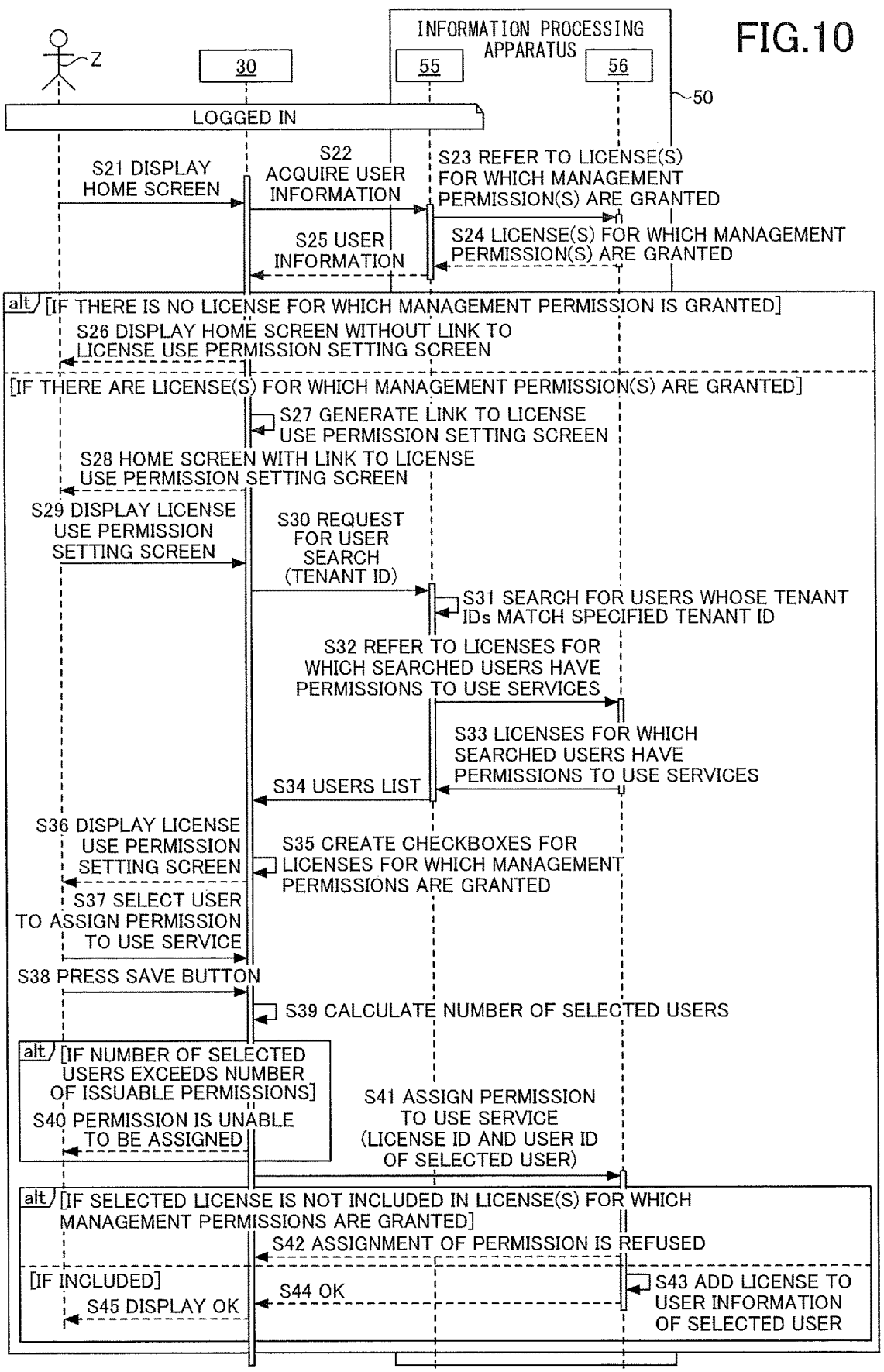
FIG. 10 is a sequence diagram illustrating a process for assigning a permission to use a service to a general user by a permission administrator.

Next, a process for assigning a permission to use a service by a permission administrator Z will be described with reference to FIG. 10 through FIG. 12. FIG. 10 is a sequence diagram illustrating a process for assigning a permission to use a service to a general user by a permission administrator Z. In FIG. 10, the permission administrator Z is already logged in, and the user ID of the permission administrator Z is identified.

In S21, the permission administrator Z uses the second terminal apparatus 30 to perform an operation for displaying a home screen.

In S22, the operation receiving unit 34 of the second terminal apparatus 30 receives the operation. The second communication unit 32 transmits a request for user information of the permission administrator Z to the information processing apparatus 50.

In S23 and S24, the fifth communication unit 52 of the information processing apparatus 50 receives the request for user information. The user management unit 55 acquires user information based on the user ID, which has been identified when the permission administrator Z logged in, and acquires license(s) for which management permission(s) are granted. In addition, the user management unit 55 acquires service information associated with the license IDs.

In S25, the fifth communication unit 52 of the information processing apparatus 50 transmits the licenses for which management permissions are granted, to the second terminal apparatus 30.

In S26, if there is no license for which a management permission is granted, the permission administrator Z is unable to assign permissions. Thus, the information processing apparatus 50 transmits a message indicating that there is no license to the second terminal apparatus 30. Then, the display control unit 33 displays a home screen without a link to a license use permission setting screen.

In S27, if there are license(s) for which management permission(s) are granted, the user management unit 55 of the information processing apparatus 50 generates a screen information of a home screen with a link to a license use permission setting screen.

In S28, the second terminal apparatus 30 receives the screen information of the home screen with the link to the license use permission setting screen, and displays the home screen with the link to the license use permission setting screen. FIG. 11 depicts an example of the home screen.

In S29, the permission administrator Z uses the link on the home screen to perform an operation for displaying the license use permission setting screen.

In S30, the operation receiving unit 34 of the second terminal apparatus 30 receives the operation. The second communication unit 32 of the second terminal apparatus 30 transmits a request for user search by specifying a tenant ID, which has been identified when the permission administrator Z logged in, to the information processing apparatus 50.

In S31, the fifth communication unit 52 of the information processing apparatus 50 receives the request for user search, and searches for users whose tenant IDs match the specified tenant ID by referring to user information. In this manner, the users belonging to the tenant can be identified.

In S32 and S33, the user management unit 55 acquires licenses for which searched users have permissions to use services. In this manner, users already having permissions to use services can be identified.

In S34, the user management unit 55 creates the users list, including the licenses for which some users have the permissions, and transmits the users list to the second terminal apparatus 30.

In S35, the display control unit 33 of the second terminal apparatus 30 generates a license use permission setting screen on which checkboxes are created for licenses, for which the permission administrator Z has a management permission, on a per user basis. In addition, the display control unit 33 sets checkmarks for the licenses for which the users already have the permissions.

In S36, the display control unit 33 of the second terminal apparatus 30 displays the license use permission setting screen. FIG. 12 depicts an example of the license use permission setting screen.

In S37, the permission administrator Z selects a user to assign or remove a permission to use a service on the license use permission setting screen.

In S38, the permission administrator Z presses a save button 273 on the license use permission setting screen.

In S39, the operation receiving unit 34 of the second terminal apparatus 30 receives the operation of the operation receiving unit 34, and the display control unit 33 calculates the number of selected users. As indicated in Table 2, the number of issuable permissions is defined for each license. Therefore, the display control unit 33 determines whether the number of users to whom permissions are assigned by the permission administrator Z exceeds the number of issuable permissions.

In S40, if the number of users to whom permissions are assigned by the permission administrator Z exceeds the number of issuable permissions, the display control unit 33 displays a message indicating that the permission is unable to be assigned.

In S41, if the number of users to whom permissions are assigned by the permission administrator Z does not exceed the number of issuable permissions, the second communication unit 32 of the second terminal apparatus 30 transmits a request for a user ID of the user to whom the permission is assigned and a license ID for which the permission is granted, to the information processing apparatus 50.

In S42, the fifth communication unit 52 of the information processing apparatus 50 receives the user ID and the license ID. At this time, if the license selected by the permission administrator Z is not included in the licenses for which the permission administrator Z has management permissions, the service information management unit 56 transmits a message, indicating that the assignment of the permission is refused, to the second terminal apparatus 30. The license is checked twice in step S35 and step S42.

In S43, if the license selected by the permission administrator Z is included in the licenses for which the permission administrator Z has management permissions, the service information management unit 56 adds the license to user information of the selected user.

Further, the log information management unit 57 stores service use permission log information in the log information storage 594. The log information management unit 57 sets the assigned license to the item "license ID", sets "assigned" to the item "action", the user ID of the permission administrator Z to the item "user ID", and the user ID of the user selected on the license use permission setting screen to the item "target user ID", and the current date and time to the item "date and time".

In S44 and S45, a message, indicating the completion of the assignment of the permission is displayed on the second terminal apparatus 30.

As described above, the permission administrator Z can assign the permission to use the service to the general user on a per license basis.

<<Home Screen and License Use Permission Setting Screen>>

Figure 11:
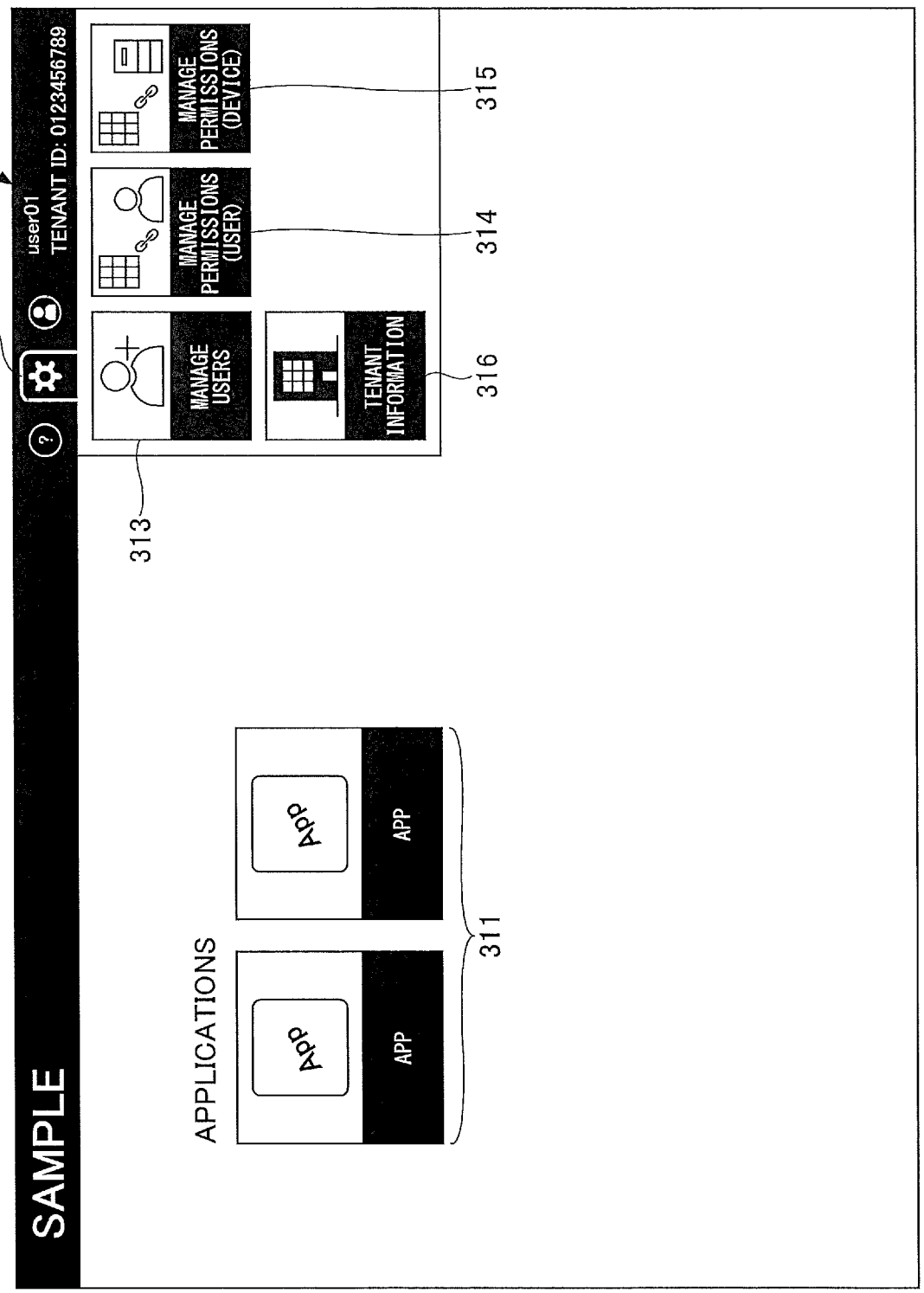
FIG. 11 is a diagram illustrating an example of a home screen.

FIG. 11 is a diagram illustrating an example of a home screen. A home screen 310 displays a list of applications 311 for which the permission administrator Z has permissions to use. Further, the home screen 310 includes a "settings" button 312. When the permission administrator Z presses the "settings" button 312, a "manage users" button 313, a "manage permissions (user)" button 314, a "manage permissions (device)" button 315, and a "tenant information" button 316 are displayed. The "manage users" button 313 is a button for displaying a user management screen on which the permission administrator Z manages user information.

The "manage permissions (user)" button 314 is a button for displaying a license use permission setting screen (user) on which the permission administrator Z manages which user can use which application. The "manage permissions (device)" button 315 is a button for displaying a license use permission setting screen (device) on which the permission administrator Z manages which electronic device 10 can use which application. The tenant information 316 is a button for displaying a screen that displays the details of tenant contracts.

The link to the license use permission setting screen described with reference to FIG. 10 includes the "manage permissions (user)" button 314 and the "manage permissions (device)" button 315. Therefore, in step S26, the home screen that does not include the "manage permissions (user)" button 314 and the "manage permissions (device)" button 315 is displayed. Accordingly, it is possible to prevent the license use permission setting screen from being displayed when there is no license for which the permission administrator Z has a management permission.

Figure 12:
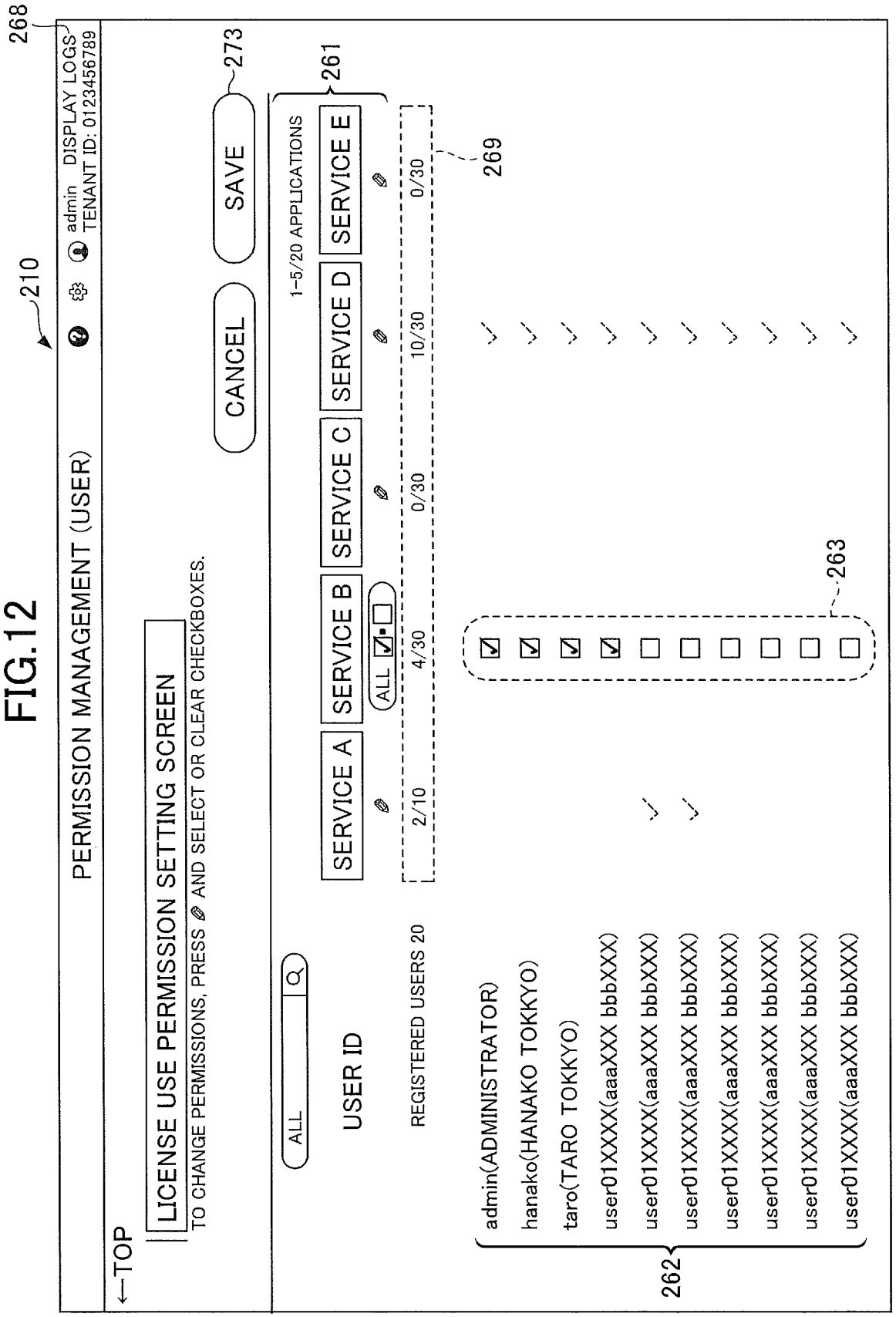
FIG. 12 is a diagram illustrating an example of a license use permission setting screen (user)

FIG. 12 is a diagram illustrating an example of a license use permission setting screen (user) 210. The overall configuration of the license use permission setting screen (user) 210 is the same as that of the license management permission setting screen 200. On the license management permission setting screen 200, a management permission is granted to a general user. On the license use permission setting screen (user), a permission to use a service is assigned to a general user.

Further, the license use permission setting screen (user) 210 displays a use count 269. The use count 269 indicates the number of permissions currently assigned (numerator) with respect to the number of issuable permissions (denominator) indicated in Table 2. The use count 269 allows the permission administrator Z to determine how many more users can be assigned permissions.

The license use permission setting screen (user) 210 includes a "display logs" button 268. The "display logs" button 268 is a button for displaying log information screens illustrated in FIGS. 17A and 17B and FIGS. 19A and 19B. When the "display logs" button 268 is pressed, processes illustrated in FIG. 16 and FIG. 18 are performed.

Figure 13:
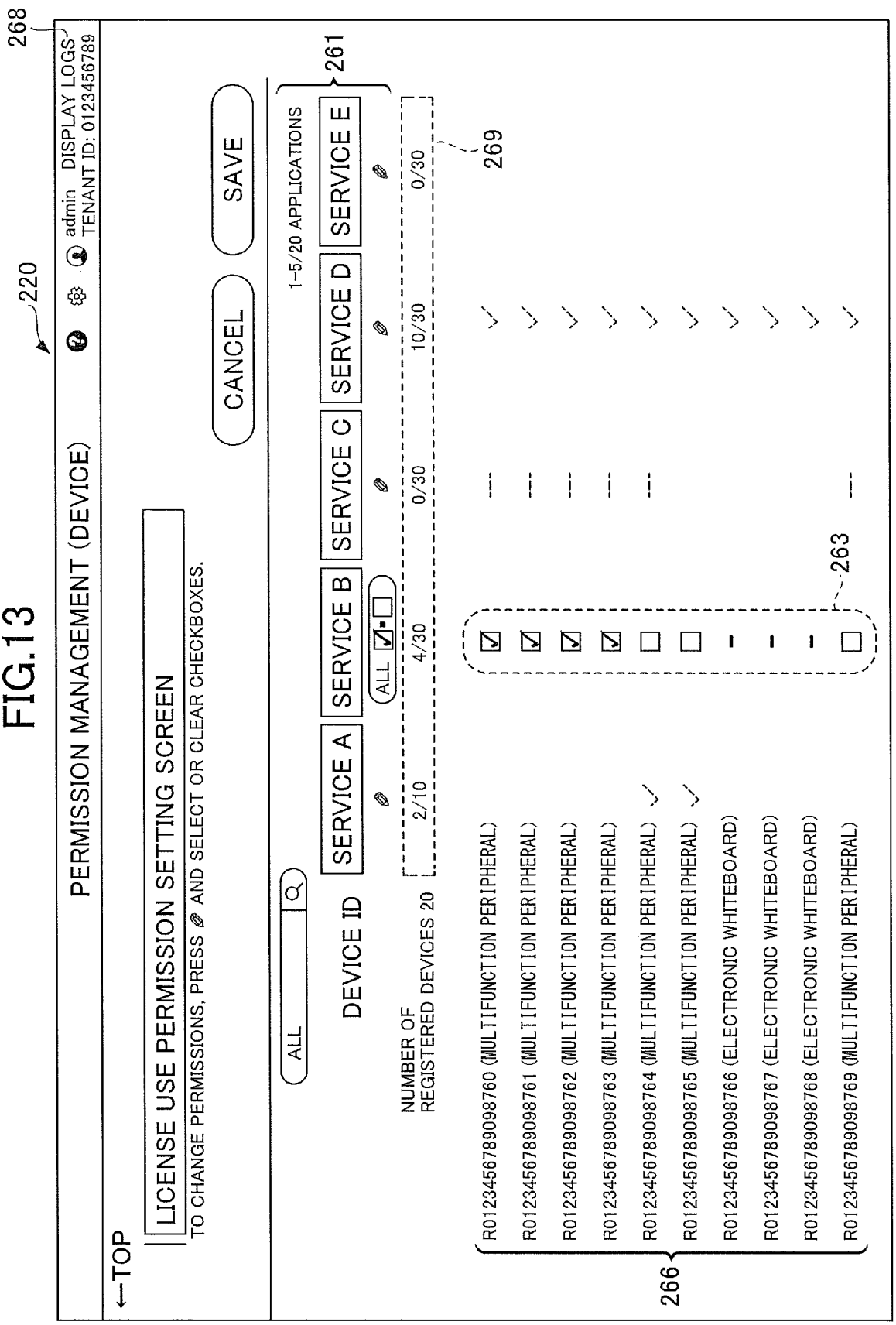
FIG. 13 is a diagram illustrating an example of a license use permission setting screen (device)

FIG. 13 is a diagram illustrating an example of a license use permission setting screen (device) 220. The license use permission setting screen (device) 220 displays a list of devices 266 associated with services, instead of the list of users. The permission administrator Z can assign permissions to use a service to electronic devices on the license use permission setting screen (device) 220.

<Login from Electronic Device>

Figure 14:
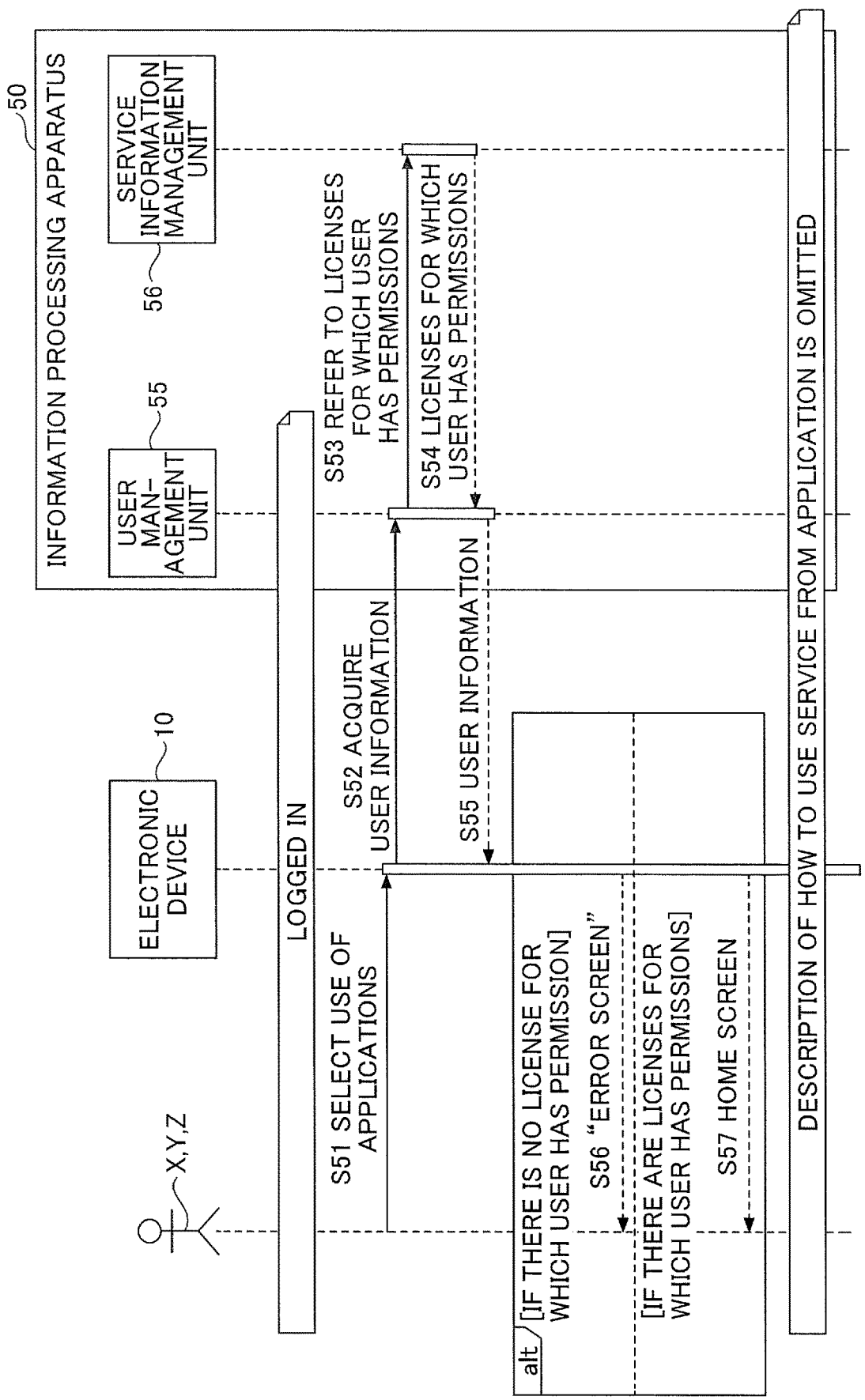
FIG. 14 is a sequence diagram illustrating a process in which a general user logs in to the electronic device to use a service.

Next, an example in which a general user logs in to the electronic device 10 to use a service will be described with reference to FIG. 14 and FIG. 15. FIG. 14 is a sequence diagram illustrating a process in which a general user logs in to the electronic device 10 to use a service. Note that, in the example of FIG. 14, it is indicated that the user is logged in, but this login is a login to the electronic device 10, and the user is not authenticated by the information processing apparatus 50.

In S51, a general user operates the electronic device 10 to start using applications. For example, the general user may display a list of applications.

In S52, the operation receiving unit 14 of the electronic device 10 receives the general user's operation. The fourth communication unit 12 transmits a request for user information of the general user to the information processing apparatus 50. Because whether or not the general user has permissions to use applications is unknown, the information processing apparatus 50 determines whether the general user has permissions. For example, the fourth communication unit 12 transmits a user ID and also indicates that the request for user information is from the electronic device 10.

In S53 and S54, the fifth communication unit 52 of the information processing apparatus 50 receives the request for user information. The user management unit 55 acquires licenses for which the general user has permissions to use, based on the user ID. Then, the user management unit 55 determines whether the licenses are available to the electronic device 10 by referring to the item "service type" of service information.

In S55, the fifth communication unit 52 of the information processing apparatus 50 transmits the licenses for which the general user has the permissions to the electronic device 10.

In S56, if there is no license for which the general user has a permission to use, the user is unable to use any application. The electronic device 10 receives a message indicating that there is no license for which the general user has a permission from the information processing apparatus 50, and the display control unit 13 displays an error screen. FIG. 15 is a diagram illustrating an example of an error screen.

In S57, if there are licenses for which the general user has permissions to use, the electronic device 10 receives screen information of a home screen that displays applications for which the general user has permissions, from the information processing apparatus 50, and the display control unit 13 displays the home screen.

<<Error Screen>>

Figure 15:
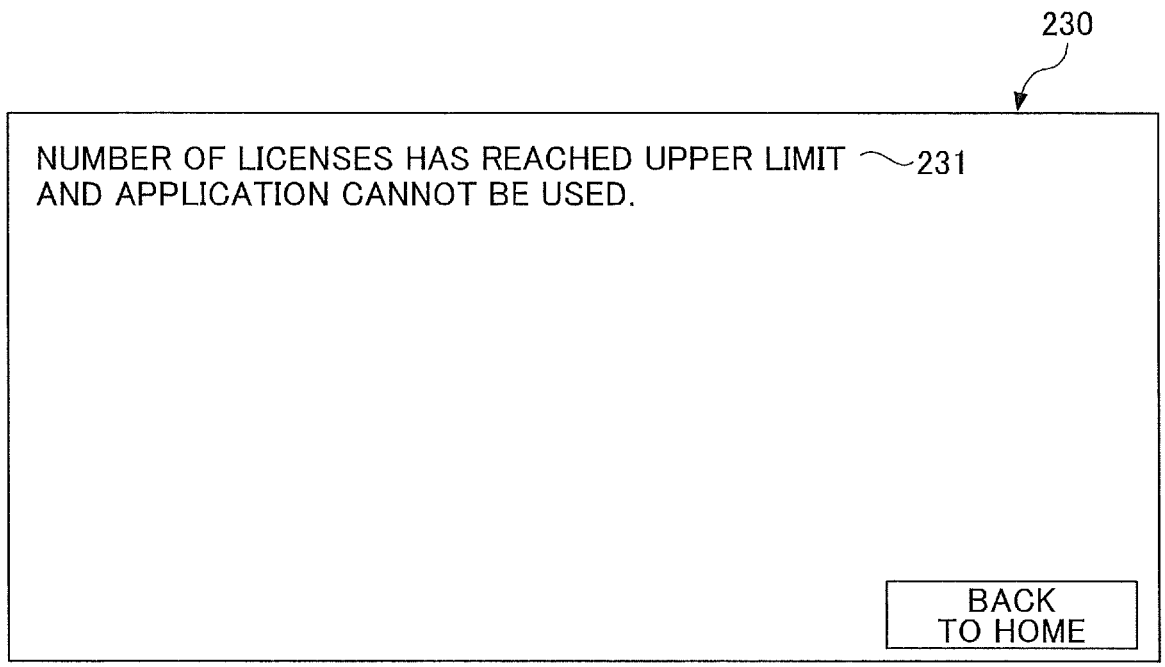
FIG. 15 is a diagram illustrating an example of an error screen.

FIG. 15 is a diagram illustrating an example of an error screen 230. The error screen 230 displays a message 231 indicating that "the number of licenses has reached the upper limit and the application cannot be used". By looking at the message 231, the user can understand that the application cannot be used. Note that the message 231 is merely an example. For example, the error screen 230 may display a message indicating that "the electronic device does not have available licenses".

<Displaying Log Information>

Next, a process for displaying log information will be described with reference to FIG. 16 through FIG. 19B. All of the contract administrator X, the tenant administrator Y, and the permission administrator Z can display log information. However, in the case of the permission administrator Z, only log information about permissions assigned by the permission administrator Z him/herself is displayed. Accordingly, the permission administrator Z can readily grasp log information about permissions assigned by the permission administrator Z him/herself.

FIG. 16 is a sequence diagram illustrating a process for displaying log information by the contract administrator X or the tenant administrator Y. In FIG. 16, an example of an operation performed by the contract administrator X or the tenant administrator Y will be described. The contract administrator X or the tenant administrator Y is already logged in to the information processing apparatus 50.

In S61, the contract administrator X or the tenant administrator Y uses the first terminal apparatus 20 to input an operation for displaying log information (press the "display logs" button 268).

In S62, the operation receiving unit 24 of the first terminal apparatus 20 receives the operation, and the first communication unit 22 transmits a request for log information to the information processing apparatus 50 by specifying the user ID.

In S63, the fifth communication unit 52 of the information processing apparatus 50 receives the request for log information, and the user management unit 55 determines the role of the contract administrator X or the tenant administrator Y. The user management unit 55 searches for user information based on the user ID used when the contract administrator X or the tenant administrator Y logged in, and determines the role. In the examples of FIG. 16, the contract administrator X or the tenant administrator Y is determined.

In S64, the user management unit 55 transmits a request for log information to the log information management unit 57, together with the role.

In S65, the log information management unit 57 receives log information including management permission logs and service use permission logs from the log information storage 594, sorts the log information in time series, and transmits the log information to the first terminal apparatus 20. All the log information can be provided to the contract administrator X or the tenant administrator Y.

Figure 17A:
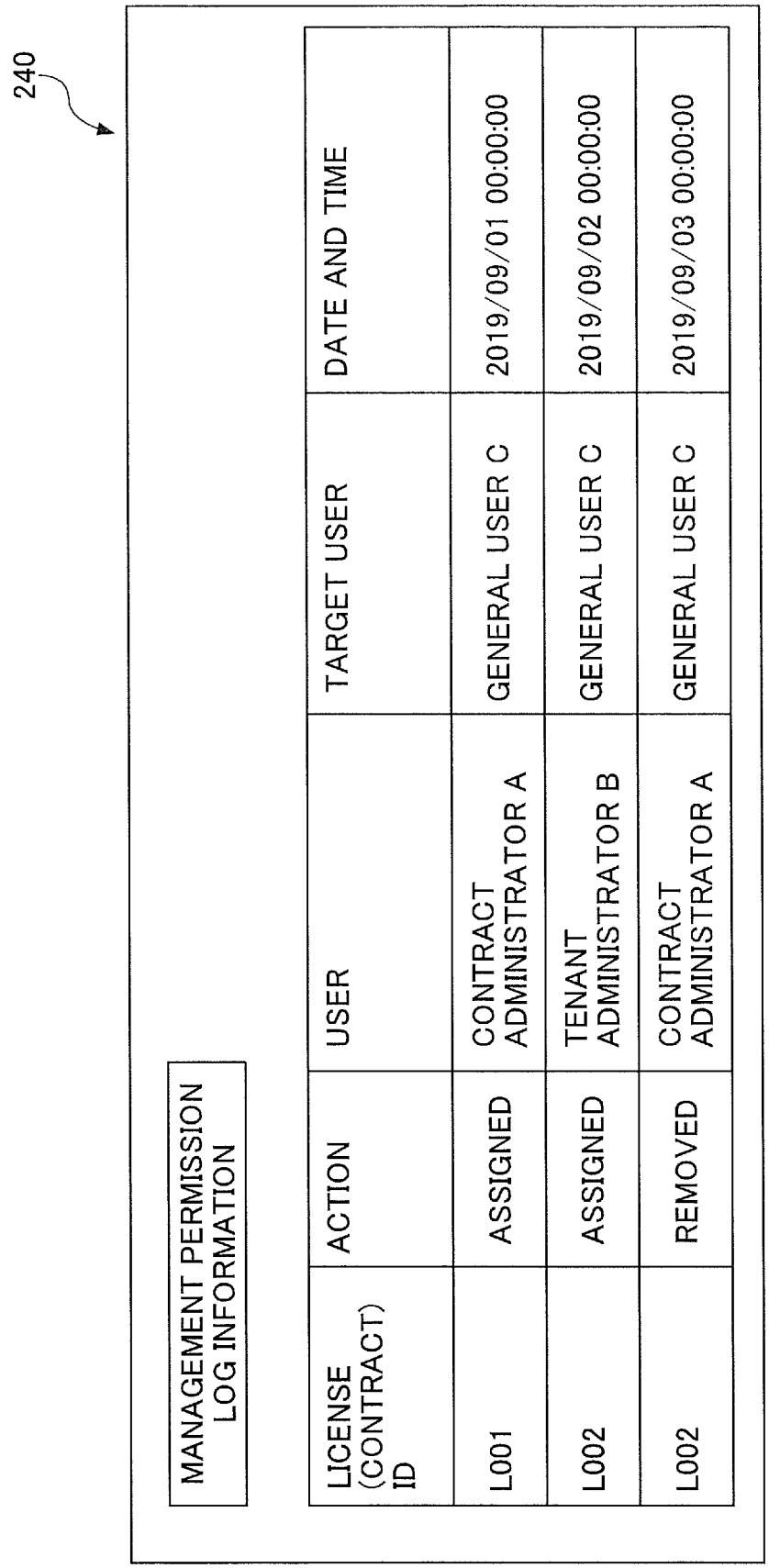

In S66, the first communication unit 22 of the first terminal apparatus 20 receives the log information, and the display control unit 23 displays the log information on log information screens. FIG. 17A and FIG. 17B are diagrams illustrating examples of log information screens.

<<Log Information Screens>>

FIG. 17A and FIG. 17B are diagrams illustrating examples of log information screens. FIG. 17A depicts a log information screen 240 that displays management permission log information. FIG. 17B depicts a log information screen 250 that displays service use permission log information. The log information screen 240 that displays management permission log information illustrated in FIG. 17A includes items such as a "license (contract) ID", an "action", a "user", a "target user", and a "date and time".

License (contract) ID: A license ID indicated in the item "management target ID" of the management permission log information of Table 4A is displayed.

Action: "Granted" or "removed" indicated in the item "action" of the management permission log information of Table 4A is displayed.

User: A user role acquired from user information based on the item "user ID" of the management permission log information of Table 4A is displayed. The "user" of the management permission log information is a contract administrator or a tenant administrator. Note that a user ID or a user name may be displayed.

Target user: A user role acquired from user information based on the item "target user ID" of the management permission log information of Table 4A is displayed. The "target user" of the management permission log information is mainly a general user. Note that a user ID or a user name may be displayed.

Date and time: A date and time when an action indicated in the item "action" of the management permission log information of Table 4A is performed is displayed.

The log information screen 250 that displays the user permission log information illustrated in FIG. 17B includes items such as a "license ID", an "action", a "user", a "target user", and a "date and time".

License ID: A license ID in the item "license ID" of the service use permission log information of Table 4B is displayed.

Action: "Assigned" or "removed" indicated in the item "action" of the service use permission log information of Table 4B is displayed.

User: A user role acquired from user information based on the item "user ID" of the service use permission log information of Table 4B is displayed. The "user" of the service use permission log information is a contract administrator X, a tenant administrator Y, or a permission administrator Z. The role of the permission administrator Z is a general user, and thus a general user is displayed in FIG. 17B. Note that a user ID or a user name may be displayed.

Target user: A user role acquired from user information acquired based on the item "target user ID" of the service use permission log information of Table 4B is displayed. The "target user" of the service use permission log information is mainly a general user. Note that a user ID or a user name may be displayed.

Date and time: A date and time when an action indicated in the item "action" of the service use permission log information of Table 4B is performed is displayed.

Referring to FIG. 17A and FIG. 17B, it can be seen that a tenant administrator B assigned a license L002 to a general user C, and the general user C who serves as a permission administrator Z assigned the license L002 to a general user D (an example of a third user). Further, the general user C removed the assignment of the license L002 from the general user D, and subsequently, a contract administrator A removed the assignment of the license L002 from the general user C.

As the assignment and removal of the assignment of licenses are logged, the contract administrator X or the tenant administrator Y can grasp the assignment status of the licenses even when a management permission is granted to a general user.

<<Displaying Logs by Permission administrator Z>>

FIG. 18 is a sequence diagram illustrating a process of displaying log information by the permission administrator Z. In FIG. 18, an example of an operation performed by the permission administrator Z will be described. The permission administrator Z is logged in to the information processing apparatus 50.

In S71 and S72, steps same as S61 and S62 of FIG. 16 may be performed.

In S73, the fifth communication unit 52 of the information processing apparatus 50 receives a request for log information, and the user management unit 55 determines the role of the permission administrator Z. The user management unit 55 searches for user information based on the user ID used when the permission administrator Z logged in, and determines the role. The role of the permission administrator Z is a general user.

In S74, the user management unit 55 transmits a request for log information to the log information management unit 57, together with the user ID registered in the user information of the permission administrator Z.

In S75, the log information management unit 57 acquires management permission log information in which the user ID of the permission administrator Z matches the target user ID, and acquires service use permission log information in which the user ID of the permission administrator Z matches the user ID. That is, the log information management unit 57 extracts management permission log information about the assignment and removal of management permissions to and from the permission administrator Z, and also service use permission log information about the assignment of permissions to use services by the permission administrator Z. For example, the information processing apparatus 50 sorts the log information in time series, and transmits the log information to the second terminal apparatus 30.

Figure 19A:
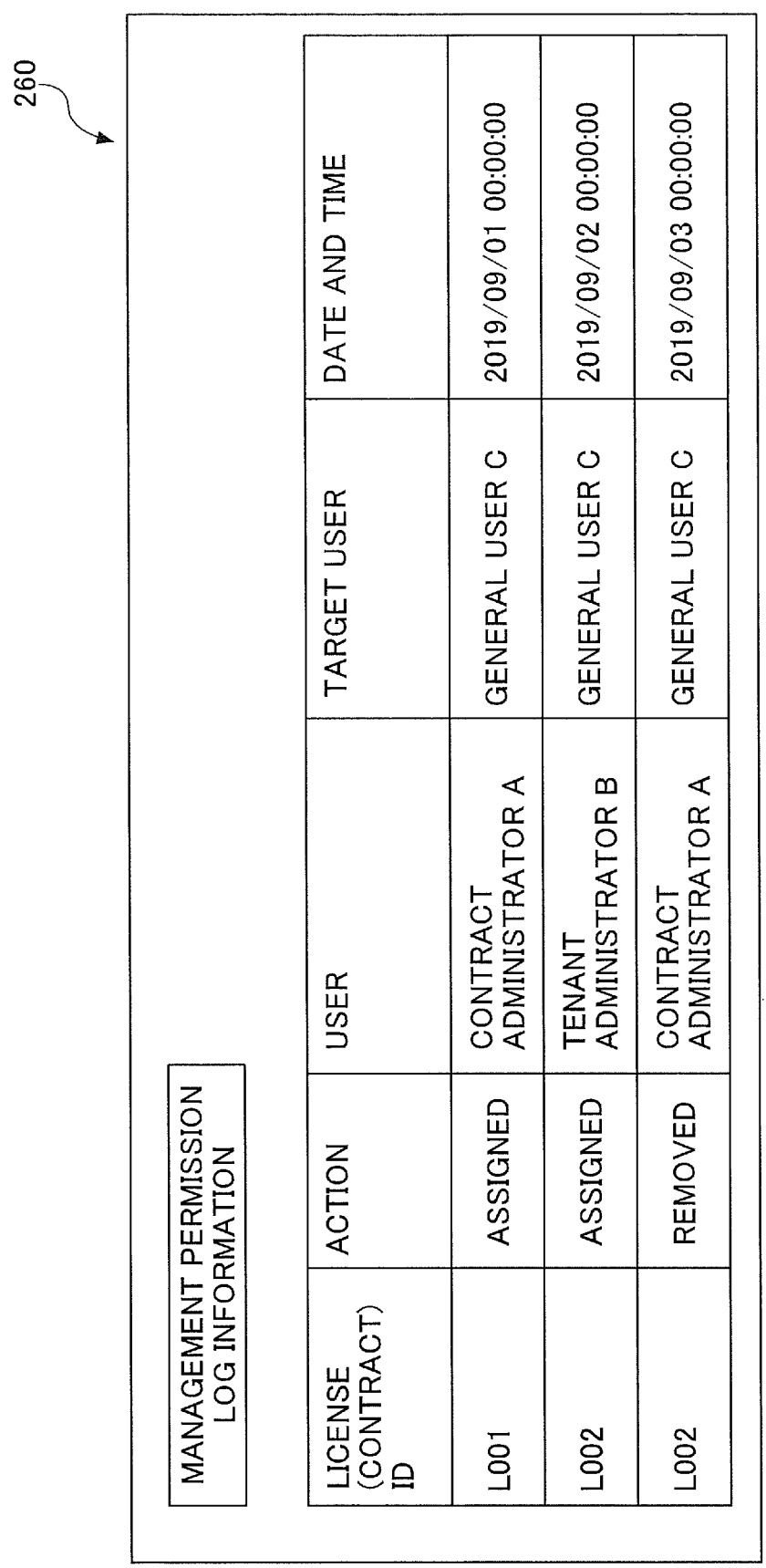

In S76, the second communication unit 32 of the second terminal apparatus 30 receives the log information, and the display control unit 33 displays the log information on log information screens. FIG. 19A and FIG. 19B are diagrams illustrating examples of log information screens.

<<Log Information Screens>>

FIG. 19A and FIG. 19B are diagrams illustrating examples of log information screens. FIG. 19A depicts a log information screen 260 that displays management permission log information. FIG. 19B depicts a log information screen 270 that displays service use permission log information. The items included in the log information screens of FIG. 19A and FIG. 19B are the same as the items of FIG. 17A and FIG. 17B.

As illustrated in FIG. 19A, the log information screen 260 displays management permission log information in which the item "target user" indicates a given permission administrator Z (a general user C in FIG. 19A) only. As illustrated in FIG. 19B, the log information screen 270 displays service use permission log information in which the item "user" indicates the given permission administrator Z (the general user C in FIG. 19B) only.

Accordingly, the permission administrator Z can understand which contract administrator X assigned and removed management permissions to and from the permission administrator Z him/herself. Further, the permission administrator Z can readily understand to whom the permission administrator Z him/herself assigned permissions to use services. In addition, because permissions to use services assigned by the contract administrator X or the tenant administrator Y are not displayed, information can be kept secret.

SUMMARY

As described above, according to the present embodiment, the information processing system 1 can assign a management permission to a responsible person (general user) who works closely with other users. Accordingly, even when the number of users in a tenant increases, permissions to use services can be assigned to appropriate users.

Other Applications

Although the embodiment of the present invention has been described in detail above, the present invention is not limited to the particulars of the above-described embodiment. Variations and replacements may be applied to the above-described embodiment without departing from the scope of the present invention.

For example, in the present embodiment, each of the terminal apparatuses use a general-purpose web browser, but may use an application dedicated to the information processing system.

Further, the functional configuration of each of the first terminal apparatus 20, the second terminal apparatus 30, the electronic device 10, and the one or more information processing apparatuses 50 is divided into the functional blocks as illustrated in FIG. 6 based on main functions thereof, in order to facilitate understanding of the processes performed by each of the first terminal apparatus 20, the second terminal apparatus 30, the electronic device 10, and the one or more information processing apparatuses 50. No limitation is intended by how the processes are divided or by the name of the processes. The processes of each of the first terminal apparatus 20, the second terminal apparatus 30, the electronic device 10, and the one or more information processing apparatuses 50 can also be divided into more processing units according to the processing contents. Further, one process can be divided to include a larger number of processes.

Further, a group of apparatuses described in the embodiments is merely one group of apparatuses in a plurality of computing environments. In a specific embodiment, the one or more information processing apparatuses 50 includes a plurality of computing devices such as server clusters. The plurality of computing devices are configured to communicate with each other via a commutation link such as a network or a shared memory, and perform the processes described herein.

Further, the one or more information processing apparatuses 50 may be configured to share various combinations of the steps described in FIG. 7, FIG. 10, FIG. 14, and FIG. 16. For example, a process performed by a predetermined unit may be performed by a plurality of information processing apparatuses included in the one or more information processing apparatuses 50. Further, the one or more information processing apparatuses 50 may be integrated into one server apparatus or may be separated.

Each of the functions of the described embodiments may be implemented by one or more processing circuits or circuitry. As used herein, the "processing circuit" includes a processor programmed to perform each function by software, such as a processor implemented in electronic circuits, an application specific integrated circuit (ASIC) designed to perform each function as described above, a digital signal processor (DSP), a field programmable gate array (FPGA), or a conventional circuit module.

What is claimed is:

1. At least one information processing apparatus for providing a service to a user having a permission to use the service, the at least one information processing apparatus comprising:
a memory, and
a processor coupled to the memory,
the memory storing instructions which cause the processor to execute
generating a list of users on a screen in response to a request from a first user who has a first management permission enabling assignment of the permission to use the service,
receiving a selection made by the first user on the screen to select a second user from the list of users,
granting the first management permission to the second user,
assigning the permission to use the service to a third user in response to a request from the second user who is granted to the first management permission, wherein
one or more services are granted under a contract with a provider of the one or more services,
the processor is further caused to execute
determining whether a second management permission is granted to the first user, the second management permission enabling assignment of a permission to use the one or more services under the contract,
generating home screen information of a home screen having a link to the screen, in response to determining that the second management permission is granted to the first user and
transmitting the home screen information of the home screen to a terminal apparatus to display the home screen.

2. The at least one information processing apparatus according to claim 1, wherein
the first user is authorized to have a predetermined permission, and
the first management permission is granted to the second user from the terminal apparatus operated by the first user.

3. The at least one information processing apparatus according to claim 2, wherein the first management permission is granted to the second user for the service for which the first user has the predetermined permission.

4. The at least one information processing apparatus according to claim 2, wherein
the processor is caused to execute allowing the second management permission to be granted to the second user on a per contract basis or on a per service basis, in accordance with a setting as to whether the second management permission is granted on the per contract basis or on the per service basis, the second management permission enabling assignment of a permission to use an entirety of the one or more services under the contract or to use the one or more services on the per service basis.

5. The at least one information processing apparatus according to claim 2, wherein the processor is caused to execute storing user information in which a role of each of users including the first user, the second user and the third user is associated with identification information of each of the users, and
the user information indicates that a role of the first user having the predetermined permission is a contract administrator or a tenant administrator.

6. The at least one information processing apparatus according to claim 1, wherein the processor is caused to execute allowing a third management permission to be granted to the third user by the second user for the service for which the second user has the first management permission, the third management permission enabling assignment of a permission to use the service.

7. The at least one information processing apparatus according to claim 1, wherein the processor is further caused to execute recording first log information indicating that the first management permission is assigned to the second user by the first user, and second log information indicating that the permission to use the service is assigned to the third user by the first user or the second user.

8. An information processing system comprising. at least one information processing apparatus for providing a service to a user having a permission to use the service, and a terminal apparatus for use by a first user, wherein
the at least one information processing apparatus includes
a first memory, and
a first processor coupled to the first memory,
the first memory storing instructions which cause the first processor to execute generating a list of users on a screen in response to a request from the first user who has a first management permission enabling assignment of the permission to use the service,
the terminal apparatus includes
a second memory, and
a second processor,
the second memory storing instructions which cause the second processor to execute receiving a selection made by the first user on the screen to select a second user from the list of users,
the first management permission is granted to the second user, and
the permission to use the service is assigned to a third user in response to a request from the second user who is granted to the first management permission,
one or more services are granted under a contract with a provider of the one or more services,
the first processor is further caused to execute
determining whether a second management permission is granted to the first user, the second management permission enabling assignment of a permission to use the one or more services under the contract,
generating home screen information of a home screen having a link to the screen, in response to determining that the second management permission is granted to the first user, and
transmitting the home screen information of the home screen to the terminal apparatus, and
the second processor is further caused to execute
receiving the home screen information,
displaying the home screen,
displaying the screen in response to the link to the screen being pressed, and
receiving a selection of the first user from the list of users such that the first user is granted the second management permission.

9. The information processing system according to claim 8, wherein the first processor is caused to execute
generating screen information that associates the list of users with a list of services on the screen, and
transmitting the screen information to the terminal apparatus, and
the second processor is caused to execute
receiving the screen information,
displaying the screen, and
transmitting identification information of the first user and identification information of the service to the at least one information processing apparatus.

10. The information processing system according to claim 8, wherein
the first processor is caused to execute
generating screen information that associates the list of users with a list of contracts on the screen, and
transmitting the screen information to the terminal apparatus, and
the second processor is caused to execute
receiving the screen information,
displaying the screen,
and
transmitting identification information of the first user and identification information of the contract to the at least one information processing apparatus.

11. The information processing system according to claim 9, wherein the first processor is caused to execute
generating the screen information that associates the list of users with the list of services, and
transmitting the screen information to the terminal apparatus, and
the second processor is caused to execute
receiving the screen information,
displaying the screen,
receiving a selection of the third user from the list of users such that the third user is granted the permission to use the service, and
transmitting identification information of the third user and the identification information of the service to the at least one information processing apparatus.

12. The information processing system according to claim 9, wherein the first processor is further caused to execute recording management permission log information indicating that the first management permission is granted to the second user by the first user, generating first screen information of a first screen that includes the first user and the second user, the first user and the second user being acquired from the management permission log information, and transmitting the first screen information of the first screen to the terminal apparatus, and
the second processor is caused to execute receiving the first screen information, and displaying the first screen that includes the first user and the second user.

13. The information processing system according to claim 12, wherein the first processor is further caused to execute recording service use permission log information indicating that the permission to use the service is assigned to the third user by the first user, generating second screen information of a second screen that includes the first user and the third user, the first user and the third user being acquired from the service use permission log information, and transmitting the second screen information of the second screen to the terminal apparatus, and
the second processor is caused to execute receiving the second screen information, and displaying the second screen that includes the first user and the third user.

14. The information processing system according to claim 13, wherein the first processor is further caused to execute recording, in the service use permission log information, the identification information of the service and information indicating whether the permission to use the service is assigned or removed, and
the second processor is caused to execute receiving the second screen information, and displaying the second screen that includes the first user and the third user, together with the identification information of the service and the information indicating whether the permission to use the service is assigned or removed.

15. The information processing system according to claim 14, wherein the first processor transmits only the management permission log information or the service use permission log information in which the first user is recorded, to the terminal apparatus, and
the second processor displays only the management permission log information or the service use permission log information in which the first user is recorded.

16. The information processing system according to claim 8, wherein, in a case where an electronic device configured to communicate with the at least one information processing apparatus requests use of one or more services while an electronic device user is logged in to the electronic device, the first processor identifies whether the electronic device user has permissions to use the one or more services, and transmits a message when the electronic device user does not have the permissions to use the one or more services, to the electronic device, and the electronic device displays the message.

17. A permission granting method performed by at least one information processing apparatus for providing a service to a user having a permission to use the service, the method comprising:

generating a list of users on a screen in response to a request from a first user who has a first management permission enabling assignment of the permission to use the service, receiving a selection made by the first user on the screen to select a second user from the list of users, granting the first management permission to the second user, assigning the permission to use the service to a third user in response to a request from the second user who is granted to the first management permission, wherein one or more services are granted under a contract with a provider of the one or more services, the permission granting method further includes determining whether a second management permission is granted to the first user, the second management permission enabling assignment of a permission to use the one or more services under the contract, generating home screen information of a home screen having a link to the screen, in response to determining that the second management permission is granted to the first user, and transmitting the home screen information of the home screen to a teiminal apparatus to display the home screen.

* * * * *